United States Patent
Aldred et al.

(10) Patent No.: US 10,588,327 B2
(45) Date of Patent: Mar. 17, 2020

(54) METHOD FOR PRODUCTION OF AERATED WATER-IN-OIL EMULSIONS AND AERATED EMULSIONS

(71) Applicant: Conopco, Inc., Englewood Cliffs, NJ (US)

(72) Inventors: Deborah Lynne Aldred, Bedford (GB); Arjen Bot, Vlaadingen (NL); Penelope Eileen Knight, Raunds (GB); Jinfeng Peng, Wageningen (NL); Jan Alders Wieringa, Gouda (NL); Qingguo Xu, Baltimore, MD (US); Shiping Zhu, Bedford (GB)

(73) Assignee: CONOPCO, INC., Englewood Cliffs, NJ (US)

( * ) Notice: Subject to any disclaimer, the term of this patent is extended or adjusted under 35 U.S.C. 154(b) by 382 days.

(21) Appl. No.: 15/225,447

(22) Filed: Aug. 1, 2016

(65) Prior Publication Data

US 2016/0338372 A1 Nov. 24, 2016

Related U.S. Application Data

(62) Division of application No. 14/387,933, filed as application No. PCT/EP2013/055567 on Mar. 18, 2013, now abandoned.

(30) Foreign Application Priority Data

Apr. 3, 2012 (EP) ..................................... 12162993

(51) Int. Cl.
| | | |
|---|---|---|
| *A23D 7/005* | (2006.01) | |
| *A23D 7/04* | (2006.01) | |
| *A23L 5/10* | (2016.01) | |

(52) U.S. Cl.
CPC ............ *A23D 7/0056* (2013.01); *A23D 7/005* (2013.01); *A23D 7/0053* (2013.01); *A23D 7/04* (2013.01); *A23L 5/12* (2016.08); *A23V 2002/00* (2013.01)

(58) Field of Classification Search
CPC .... A23D 7/0053; A23D 7/0056; A23D 7/005; A23D 7/04; A23L 5/12; A23V 2002/00
See application file for complete search history.

(56) References Cited

U.S. PATENT DOCUMENTS

| | | | |
|---|---|---|---|
| 2,937,093 A | 5/1960 | Gorman et al. | |
| 3,944,680 A | 3/1976 | van Pelt et al. | |
| (Continued) | | | |

FOREIGN PATENT DOCUMENTS

| | | |
|---|---|---|
| DE | 69723027 | 4/2004 |
| EP | 0285198 | 10/1988 |
| (Continued) | | |

OTHER PUBLICATIONS

Search Report in EP12162993, dated Oct. 15, 2012.
(Continued)

*Primary Examiner* — Subbalakshmi Prakash
(74) *Attorney, Agent, or Firm* — Foley & Lardner LLP

(57) ABSTRACT

The present invention relates to a method for the production of aerated water-in-oil emulsions containing sucrose fatty acid esters. The invention further relates to aerated water-in-oil emulsions containing sucrose fatty acid esters, and to use of the composition for shallow flying and baking of food products. The method comprises a step wherein an oil is mixed with sucrose fatty acid ester, followed by aeration of this mixture. The obtained foamed oil is mixed with a water-in-oil emulsion.

12 Claims, 14 Drawing Sheets

(56) References Cited

U.S. PATENT DOCUMENTS

| | | |
|---|---|---|
| 4,396,638 A | 8/1983 | Edo et al. |
| 4,478,867 A | 10/1984 | Zobel et al. |
| 5,374,445 A | 12/1994 | Havenstein et al. |
| 5,478,588 A | 12/1995 | Talignani |
| 2003/0104110 A1 | 6/2003 | Sikking et al. |
| 2003/0228339 A1 | 12/2003 | El-Nokaly et al. |
| 2004/0076731 A1 | 4/2004 | Bourke |
| 2004/0219278 A1 | 11/2004 | Reddy |
| 2006/0078659 A1 | 4/2006 | Komatsu et al. |
| 2008/0175958 A1 | 7/2008 | Staeger et al. |
| 2008/0254194 A1 | 10/2008 | Anton et al. |
| 2008/0268131 A1 | 10/2008 | Anton et al. |
| 2011/0045037 A1 | 2/2011 | Tamarkin et al. |

FOREIGN PATENT DOCUMENTS

| | | | |
|---|---|---|---|
| EP | 0410507 | 1/1991 | |
| EP | 0410507 A2 * | 1/1991 | ............ A23D 7/013 |
| EP | 0375238 | 10/1991 | |
| EP | 1052284 | 10/2006 | |
| EP | 1938697 | 7/2008 | |
| EP | 2042154 | 4/2009 | |
| JP | 2006304665 | 11/2006 | |
| WO | WO9412063 | 6/1994 | |
| WO | WO9818337 | 5/1998 | |
| WO | WO0038546 | 7/2000 | |
| WO | WO2004041002 | 5/2004 | |
| WO | WO2008110502 | 9/2008 | |
| WO | WO2010076318 | 7/2010 | |
| WO | WO2010112835 | 10/2010 | |
| WO | WO-2010112835 A2 * | 10/2010 | ............... A23G 1/36 |

OTHER PUBLICATIONS

Search Report in PCTEP2013055567, dated Apr. 24, 2013.
Written Opinion in PCTEP2013055567, dated Apr. 24, 2013.
Alderliesten, M; Mean Particle Diameters Part II: Standardization of Nomenclature; Part. Part. Syst. Charact. 8 (1991) 237-241.

* cited by examiner

METHOD FOR PRODUCTION OF AERATED WATER-IN-OIL EMULSIONS AND AERATED EMULSIONS

CROSS REFERENCE TO RELATED APPLICATIONS

This application is a divisional of U.S. application Ser. No. 14/387,933, filed Sep. 25, 2014, which is a U.S. National Stage Application under 35 U.S.C. § 371 of International Application No PCT/EP2013/055567, filed Mar. 18, 2013, which claims priority to EP Application 12162993, filed Apr. 3, 2012, the entire disclosures of which are hereby incorporated by reference for any and all purposes.

The present invention relates to a method for the production of aerated water-in-oil emulsions containing sucrose fatty acid esters. The invention further relates to aerated water-in-oil emulsions containing sucrose fatty acid esters, and to use of the composition for shallow frying and baking of food products.

BACKGROUND OF THE INVENTION

Many food products are aerated, such as mousses, ice cream, and whipped cream. These food products contain small gas bubbles, and the gases may include air, nitrogen, and/or carbon dioxide. Aerated food products are being developed with two aspects which are of importance: first the foamability (how easy is it to aerate the food product), and second the stability of the aeration during storage (how well do the air bubbles remain intact upon storage of the aerated food product).

Water-in-oil emulsions like spreads, butter and margarine, may contain air bubbles, in order to reduce the caloric content of the product and/or to provide a product with an attractive structure.

Whipped butter is generally made by whipping air into softened butter at slightly elevated temperatures, and then cooling it. U.S. Pat. No. 2,937,093 discloses a process for manufacturing whipped margarine. This process comprises combining liquid margarine with an inert gas (e.g. nitrogen), cooling the mixture, agitating the cooled mixture under pressure to produce a flowable mass, and then releasing the pressure.

EP 285 198 A2 discloses food products such as margarine or shortening comprising a continuous fat phase and a dispersed gas phase, which exhibit an improved spattering behaviour when used for frying. The product is produced on a votator line and the gas is incorporated in the composition near the beginning of the line, while the composition still comprises essentially no crystallized fat.

The use of sucrose fatty acid esters in fat-continuous emulsions is known.

EP 1 052 284 A1 claims a setting agent of fats and oils containing sucrose fatty acid ester with a HLB smaller than 3, and mentions margarine and fat spreads that may contain the mixture of fat and sucrose fatty acid ester. The setting agent is used to modify the hardness of the oil phase.

EP 375 238 A2 discloses aerated fatty composition containing at least 5 wt %, preferably 20 wt % to 55 wt % of sugar fatty acid ester. The other part of the fatty composition is optionally fatty materials like triglycerides, lipid soluble flavours, emulsifiers, and colourants. The compositions are in the form of shortenings, hence free from water. The examples disclose sucrose octa-esters and sucrose hepta-esters. The fatty composition may be used as a table spread, albeit not in the form of an emulsion, but as a water-free spread.

EP 410 507 A2 discloses polyol fatty acid polyesters for use in aerated fat continuous products. The fat blend of the continuous phase comprises at least 50% of the polyol fatty acid polyesters. A preferred polyol is sucrose. The fat compositions may be used in chocolate-like food products.

WO 2010/112835 A2 discloses aerated oil continuous emulsion containing an emulsifier with HLB value less than 8, preferably 2 to 7, more preferred 4 to 6. The emulsifier may be a sucrose ester. The aerated emulsion is made by first mixing the oil and water phases, followed by aerating the emulsion. The gas bubbles may be located in the fat phase of the emulsion, and the walls of the gas bubbles may be formed from fat phase material.

US 2006/0078659 A1 discloses a mousse-type spread comprising a water-in-oil type emulsion, that may contain sucrose fatty acid ester as emulsifier (with HLB value less than 7, preferably less than 5). The mousse is formed when the emulsion is discharged from a nozzle under pressure.

WO 00/38546 discloses an aerated water-in-oil emulsion, wherein the aqueous phase is aerated using a sucrose ester with a HLB value of 16, before it is mixed with a continuous oil phase. The size of the air bubbles is preferably between 0.5 and 25 micrometer, more preferred between 1 and 5 micrometer.

Similarly, WO 94/12063 describes aerated emulsions, that may be in the form of water-in-oil or oil-in-water emulsions. Mono-, di- or tri-longchain fatty acid esters of sucrose are used, e.g. sucrose monostearate ester. The gas bubbles are prepared in the aqueous phase first, before being mixed with the oil phase.

Sucrose fatty acid esters have also been described in aerated oil-in-water emulsions, e.g. in EP 2 042 154 A1, DE 697 23 027 T2, JP 2006-304665, WO 2004/041002 A1, and WO 2008/110502 A1.

SUMMARY OF THE INVENTION

Current methods often have the disadvantage that the foams are not stable enough to be used in a fat-continuous food product which upon storage remains stable for at least a month, preferably several months. Additionally it has not been possible to provide stable aerated oil-continuous food products, that have a relatively high overrun and uniform bubble size distribution, and relatively small air bubbles. Moreover, aeration of a fat-continuous food composition by a foam is difficult in that the foam is often based on an aqueous composition, which is difficult to mix with a fat-based food product. Generally gas bubbles in an aqueous composition make it difficult to disperse the aqueous phase in a continuous fat phase. The bubbles generally will lead to a coarser water droplet structure, and hence a coarser structure of the resulting fat continuous product containing a dispersed aqueous phase with gas bubbles. Thus there remains a need for a simple and improved method for producing aerated fat-continuous food compositions, and in particular processes which results in relatively high overruns and uniformly sized, small gas bubbles.

We have now found that stable aerated fat-continuous emulsions can be prepared by a method involving making a water-in-oil emulsion first, and mixing this emulsion with an aerated liquid oil that contains sucrose fatty acid ester with a HLB value ranging from 1 to 7. This method has the advantage that aerated fat-continuous emulsions can be produced with fine, homogeneously distributed gas bubbles.

Moreover the structure of the emulsion and the fine gas bubbles are retained during storage of the emulsion, also when the emulsion is subjected to temperature changes during storage.

Hence in a first aspect the present invention provides a method for preparation of a composition in the form of an aerated water-in-oil emulsion, having an overrun ranging from 1% to 200%, comprising the steps:
a) preparing a water-in-oil emulsion;
b) providing a liquid mixture of a sucrose fatty acid ester having a HLB value ranging from 1 to 7 and an oil and aerating this mixture; and
c) mixing the aerated mixture from step b) with the emulsion from step a).

In a second aspect the present invention provides a composition in the form of an aerated water-in-oil emulsion,
comprising a sucrose fatty acid ester having a HLB value ranging from 1 to 7 at a concentration ranging from 0.2% to 5% based on the weight of the composition;
wherein the composition comprises oil at a concentration ranging from 30% to 90% by weight of the composition;
wherein the composition has an overrun ranging from 1% to 200%; and
wherein at least 50% of the volume of the gas is made up by gas bubbles having a volume based equivalent diameter of maximally 60 micrometer, preferably maximally 50 micrometer.

In a third aspect the present invention provides use of a composition prepared according to the method of the first aspect of the invention or according to the second aspect of the invention for shallow frying of food products or for cooking or baking of food products.

DETAILED DESCRIPTION

Unless defined otherwise, all technical and scientific terms used herein have the same meaning as commonly understood by one of ordinary skill in the art.

All percentages, unless otherwise stated, refer to the percentage by weight, with the exception of overrun. The abbreviation 'wt %' refers to percentage by weight.

In case a range is given, the given range includes the mentioned endpoints.

The average water droplet diameter in the water-in-oil emulsion is generally expressed as the d3,3 value, which is the volume weighted geometric mean droplet diameter, unless stated otherwise. The normal terminology for nuclear magnetic resonance (NMR) is used to measure the parameters d3,3 and sigma (or alternatively exp(sigma)) of a log-normal water droplet size distribution. Sigma is the standard deviation of the logarithmic of the droplet diameter d3,3.

The average gas bubble diameter is expressed as the d4,3 value, which is the volume weighted mean diameter. The gas bubbles in a product may not be perfect spheres. The volume based bubble diameter equals the diameter of a sphere that has the same volume as a given bubble. Additionally the d1,0 value is used as well, which is the number average diameter of a population of gas bubbles. Also the d1,0 is corrected for the non-spherical shape of the gas bubbles.

Ambient temperature is considered to be a temperature between about 20° C. and about 25° C., preferably between 20° C. and 25° C., preferably between 20° C. and 23° C.

The term 'aerated' means that gas has been intentionally incorporated into a composition, for example by mechanical means. The gas can be any gas, but is preferably, in the context of food products, a food-grade gas such as air, nitrogen, nitrous oxide, or carbon dioxide. Hence the term 'aeration' is not limited to aeration using air, and encompasses the 'gasification' with other gases as well. The extent of aeration is usually measured in terms of 'overrun', which is defined as:

$$\text{overrun} = \frac{\text{volume of aerated product} - \text{volume of initial mix}}{\text{Volume of initial mix}} \times 100\% \quad (1)$$

where the volumes refer to the volumes of aerated product and unaerated initial mix (from which the product is made). Overrun is measured at atmospheric pressure.

The overrun of an aerated product and the volume fraction of gas in the aerated product generally relate in the following way.

| Overrun [%] | Volume fraction gas [vol. %] |
|---|---|
| 10% | 9.1% |
| 20% | 16.7% |
| 50% | 33.3% |
| 100% | 50.0% |
| 200% | 66.7% |
| 300% | 75.0% |
| 500% | 83.3% |

After formation, a foam will be vulnerable to coarsening by mechanisms such as creaming, Ostwald ripening and coalescence. By creaming, gas bubbles migrate under the influence of gravity to accumulate at the top of a product. Ostwald ripening or disproportionation refers to the growth of larger bubbles at the expense of smaller ones. Coalescence refers to merging of air bubbles by rupture of the film in between them.

A stable foam or aerated product in the context of the present invention is defined as being stable for at least 30 minutes, more preferred at least an hour, more preferred at least a day, more preferred at least a week, and even more preferred at least a month, and most preferred several months. A stable foam can be defined to be stable with regard to total foam volume, and/or gas bubble size, and looses maximally 20% of its volume during 1 month storage. On the other hand systems may exist which loose more than 20% of its volume during 1 month storage, which nevertheless are considered to have a good stability, as the stability of such foams is much better than comparative foams that do not contain sucrose esters. Foams of which the average bubble size strongly increases over time are regarded to be less stable than foams of which the average bubble size remains small over time.

Fats and Oils

The terms 'fat' and 'oil' are used interchangeably in here. Where applicable the prefix 'liquid' or 'solid' is added to indicate if the fat or oil is liquid or solid at ambient temperature as understood by the person skilled in the art. The term 'structuring fat' refers to a fat that is solid at ambient temperature. The structuring fat serves to structure the emulsion by providing at least part of the structuring fat for the emulsion. The term 'liquid oil' refers to an oil that is liquid at ambient temperature. In common language, liquid fats are often referred to as oils but herein the term fats is also used as a generic term for such liquid fats.

Edible oils contain a large number of different triacylglycerols (TAGs) with varying physical properties. The TAGs are esters of glycerol and three fatty acids. The TAGs in edible oils contain fatty acids with an even number of carbon atoms in the chains, generally varying between 4 and 24 in number. Common fatty acids from vegetable origin are C10, C12, C14, C16, C18, C20 and C22, and most common TAGs are composed of these fatty acids. The fatty acids may be saturated, or monounsaturated or polyunsaturated. Each fatty acid can contain up to three double bonds at certain positions in the chain. Additionally especially fish oil contains a high number of unsaturated fatty acids with more than one unsaturated bond in the chain, up to even 4 or 5 double bonds. The terms 'triacylglycerols', 'TAGs', and 'triglycerides' may be used interchangeably in here. In the context of the present invention, triglycerides are understood to be edible oils and fats.

The structuring fat may be a single fat or a mixture of different fats. The structuring fat may be of vegetable, animal (e.g. dairy fat) or marine origin. Preferably at least 50 wt % of the structuring fat (based on total amount of structuring fat) is of vegetable origin, more preferably at least 60 wt %, even more preferably at least 70 wt %, still more preferably at least 80 wt %, even still more preferably at least 90 wt % and even still more further preferably at least 95 wt %. Most preferably the structuring fat essentially consists of structuring fat of vegetable origin.

Preferably the structuring fat is selected from the group consisting of palm fat, allan blackia, pentadesma, shea butter, coconut oil, soybean oil, rapeseed oil and dairy fat. More preferably the natural fat is selected from the group consisting of palm oil, palm kernel oil, palm oil fraction, palm kernel fraction, coconut oil and dairy fat fraction. Even more preferably the natural fat is selected from the group consisting of palm oil, palm kernel oil, palm oil fraction, palm kernel fraction and coconut oil.

The various fat sources may be fully hardened by full hydrogenation, they may be fractionated, chemically or enzymatically intra-esterified, and/or chemically or enzymatically inter-esterified.

As the purpose of the structuring fat is to provide structure to the spread it may be preferred not to include too many and/or too much of additional components that do not primarily add to the structuring ability of the structuring fat, like for example protein and carbohydrates. Preferably the structuring fat comprises not more than 20 wt % of protein and/or carbohydrates, more preferably not more than 15 wt %, even more preferably not more than 10 wt %, and still more preferably not more than 5 wt %. Most preferably no protein and carbohydrates are present. Moreover, preferably the amount of water is not more than 20 wt %, preferably not more than 10 wt % and more preferably not more than 5 wt %. Most preferably no water is present in the structuring fat.

To optimize the structuring capacity and/or impression of the emulsion in the mouth upon consumption, structuring fats having a certain solid fat content are preferred. Therefore, the structuring fat as present in the solid particles preferably has a solid fat content N10 from 50 to 100%, N20 from 26 to 95% and N35 from 5 to 60%. The N-value expresses the solid fat content (SFC) at a certain temperature (in ° C.).

The structuring fat preferably has a solid fat content N10 selected from the list consisting of 45 to 100%, 55 to 90% and 65 to 85%;

N20 selected from the list consisting of 25 to 80%, 40 to 70% and 45 to 65%;

N35 selected from the list consisting of 0.5 to 60%, 0.5 to 20%, 0.5 to 14%, 15 to 50% and 30 to 45%.

Preferred solid fat content profiles of the structuring fat are:

N10 from 45 to 100%, N20 from 25 to 80% and N35 from 0.5 to 60%;

N10 from 55 to 90%, N20 from 40 to 70% and N35 from 0.5 to 20%;

N10 from 55 to 90%, N20 from 40 to 70% and N35 from 15 to 50%;

N10 from 65 to 85%, N20 from 45 to 65% and N35 from 0.5 to 14%; and

N10 from 65 to 85%, N20 from 45 to 65% and N35 from 30 to 45%.

Instead of a structuring fat, also other structuring components like oleogels, or organogels may be used.

Both the structuring fat as well as the liquid oil may originate from various edible natural oils. Fats include: plant oils (for example: allanblackia oil, apricot kernel oil, arachis oil, arnica oil, argan oil, avocado oil, babassu oil, baobab oil, black seed oil, blackberry seed oil, blackcurrant seed oil, blueberry seed oil, borage oil, calendula oil, camelina oil, camellia seed oil, castor oil, cherry kernel oil, cocoa butter, coconut oil, corn oil, cottonseed oil, evening primrose oil, grapefruit oil, grape seed oil, hazelnut oil, hempseed oil, illipe butter, lemon seed oil, lime seed oil, linseed oil, kukui nut oil, macadamia oil, maize oil, mango butter, meadowfoam oil, melon seed oil, moringa oil, mowrah butter, mustard seed oil, olive oil, orange seed oil, palm oil, palm kernel oil, papaya seed oil, passion seed oil, peach kernel oil, plum oil, pomegranate seed oil, poppy seed oil, pumpkins seed oil, rapeseed (or canola) oil, red raspberry seed oil, rice bran oil, rosehip oil, safflower oil, seabuckthorn oil, sesame oil, shea butter, soy bean oil, strawberry seed oil, sunflower oil, sweet almond oil, walnut oil, wheat germ oil); fish oils (for example: sardine oil, mackerel oil, herring oil, cod-liver oil, oyster oil); animal oils (for example: butter or conjugated linoleic acid, lard or tallow); or any mixture or fraction thereof. The oils and fats may also have been modified by hardening, fractionation, chemical or enzymatical interesterification or by a combination of these steps.

The oil phase of the emulsion prepared in the method of the invention may be liquid at room temperature, or may be solid or partly solid at room temperature, or may be combination of both types of oil. Examples of oils that are liquid at room temperature are sunflower oil, olive oil, rapeseed oil, and other commonly known liquid vegetable oils. Examples of oils that are solid or partly solid at room temperature are coconut oil, dairy fat, and palm oil or palm oil fractions. Dairy fat is of animal origin, and most commonly is sourced from the milk of mammals like cows, sheep, and goats. These fats are preferred for use in the emulsions prepared in the method of the invention.

Generally natural oils are contain at, least 80% of triglycerides. Natural oils also may contain other compounds than triglycerides, such as diglycerides, monoglycerides and free fatty acids. Also compounds like lecithin, other emulsifiers, phytosterols, phytostanols, waxes, colourants like carotenoids, vitamins like vitamin A, D, E, and K, and antioxidants like the tocopherols (vitamin E) may be present in a natural oil.

HLB Value

HLB values are a well-known classification of surfactants or mixtures of surfactants, based on the ratio of the hydrophilic and hydrophic portions of the surfactant molecules.

The HLB value is given by the equation $HLB = 20 * M_h/M$, where $M_h$ is the molecular mass of the hydrophilic part of the molecule and M is the molecular mass of the whole molecule thus giving a value on an arbitrary scale of 0 to 20. For fatty acid esters, HLB=20 (1−S/A) where
S=Saponification value
A=Acid number of the fatty acid Therefore an HLB value of 0 corresponds to a completely hydrophobic molecule and an HLB value of 20 corresponds to a completely hydrophilic molecule. Typical HLB values are:

| | |
|---|---|
| 0 to 3 | an anti-foaming agent |
| 4 to 6 | a water-in-oil emulsifier |
| 7 to 9 | a wetting agent |
| 8 to 18 | an oil-in-water emulsifier |
| 13 to 15 | a detergent |
| 10 to 18 | a solubiliser or a hydrotrope |

Sucrose Fatty Acid Ester

The definition of sucrose fatty acid ester in the present invention document are compounds which are esters of sucrose and one or more fatty acids. Sucrose is also known as table sugar and as saccharose. Sucrose is a disaccharide composed of glucose and fructose with the molecular formula $C_{12}H_{22}O_{11}$. Sucrose esters of fatty acids can be obtained by esterifying one or more of the hydroxyl group of a sucrose molecule with fatty acids. The fatty acids react with one or more hydroxyl groups to form mono, di, tri or multi-fatty acid ester, or mixtures thereof. As sucrose has 8 hydroxyl groups, the maximum number of fatty acids that is esterified to one sucrose molecule is eight, to form sucrose octa fatty acid ester. Due to the production process of the sucrose fatty acid esters (see EP 1 813 622 A1), a sample of sucrose fatty acid esters may comprise a mixture of mono-, di-, tri-, and multi fatty acid esters. In a commercial sample the degree of esterification generally has a distribution, therefore it is usually expressed in terms of average degree of substitution (hereinafter also referred to simply as "degree of substitution").

Preferably the sucrose fatty acid ester comprises a mixed ester or homo-ester. Suitable fatty acids may vary both in alkyl chain length and in degree of unsaturation. Suitable fatty acids are saturated fatty acids including but not limited to capric acid, lauric acid, myristic acid, palmitic acid, stearic acid, arachic acid, behenic acid, lignoceric acid or cerotic acid. Likewise, monounsaturated fatty acids including but not limited to lauroleic acid, myristoleic acid, palmitoleic acid, oleic acid, gadoleic acid or erucic acid are also suitable. Similarly, polyunsaturated fatty acids including but not limited to linoleic acid, linolenic acid, elaeostearic acid, arachidonic acid or cervonic acid are suitable too. The fatty acid is preferably selected from the group consisting of lauric acid, myristic acid, palmitic acid, stearic acid and mixtures thereof. The fatty acid will also influence the melting temperature of the sucrose fatty acid ester, similarly as for triglycerides.

Sucrose fatty acid esters can also be mixtures of different compounds. In one way, mixtures of sucrose fatty acid esters may be mixtures in terms of compounds with a different degree of substitution. In a second way, mixtures of sucrose fatty acid esters may be mixtures of compounds with different types of fatty acids. Mixtures of sucrose fatty acid ester may also be mixtures according to the first and the second ways simultaneously. For example, a sucrose fatty acid ester mixture with both palmitic acid and stearic acid residues may for instance comprise sucrose monostearate, sucrose monopalmitate, sucrose distearate, sucrose dipalmitate, monopalmitoyl sucrose monostearate, dipalmitoyl sucrose monostearate, etcetera. For the purpose of this invention the term sucrose fatty acid ester is intended to include both single compounds and mixtures of single compounds according to the above two ways, unless specified otherwise.

Apart of their structure, sucrose fatty acid esters or mixtures may also be characterised by their properties. The most noteworthy property is their hydrophilic-lipophilic balance or HLB value. Sucrose esters are available with a wide range of HLB values which are controlled by the degree of esterification and the type of fatty acid used. All sucrose esters from commercial suppliers are a mixture of different fatty acids with different degrees of esterification. For example, Mitsubishi-Kagaku Foods Corporation (Tokyo, Japan) supplies amongst others L195 (sucrose laurate), S070 (sucrose stearate), S170, S270, S370, S570, S770, S970, S1670, P170 (sucrose palmitate), O-170 (sucrose oleate) and B-370 (sucrose behenate). Generally the name of the various types of commercial samples is given by the main fatty acid and the HLB value for the sucrose esters. For example, L195 contains about 95% lauric acid and another 5% are palmitic acid, stearic acid, etc, and its HLB value equals to 1. S070, S170, S270, S370, S570 are sucrose stearic acid esters with 70% stearic acid and HLB values ranging from <1, 1, 2, 3 and 5, respectively. Its HLB value increases with the increasing of the amount of mono- or di-esters. For example S170 has very little mono ester therefore its HLB value is 1. For S570, its HLB value is 5 as it contains about 30% mono ester. Especially preferred sucrose fatty acid esters for use in the present invention are S370, S570, S770, and more preferred are S370, S570, and most preferred is S370.

Another supplier of suitable sucrose fatty acid esters is Sisterna BV (Roosendaal, The Netherlands). Sisterna uses a similar naming convention as Mitsubishi-Kagaku Foods Corporation.

Sucrose fatty acid esters are approved in Europe for use as food additive, and are known as E473—sucrose esters of fatty acids.

Sucrose fatty acid esters with HLB values of 1 or 2 are known as good water-in-oil emulsifiers, to produce water-in-oil emulsion with low oil content.

Method According to the Invention

The first aspect the present invention provides a method for preparation of a composition in the form of an aerated water-in-oil emulsion, having an overrun ranging from 1% to 200%, comprising the steps:

a) preparing a water-in-oil emulsion;
b) providing a liquid mixture of a sucrose fatty acid ester having a HLB value ranging from 1 to 7 and an oil and aerating this mixture; and
c) mixing the aerated mixture from step b) with the emulsion from step a).

Preferably the method of the invention is for the preparation of an edible composition in the form of an aerated water-in-oil emulsion. Preferably in step a) the emulsion is in the form of a spread. A spread means that the emulsions can be spread using a knife on a solid or semi-solid surface like bread or toast when taken from a refrigerator.

In step a) a water-in-oil emulsion is prepared, preferably in the form of a spread. This can be done in a conventional way. For example, in case a spread will be produced as the composition according to the invention, then in step a) an emulsion can be prepared using a conventional scraped surface heat exchanger for cooling and crystallising a mixture of oil and water, followed by a mixing operation of the cooled emulsion. Such a process may be a votator process, including the preparation of a premix containing an aqueous phase and an oil phase, and one or more A-units which serve a scraped surface heat exchangers, to crystallise fats. In the premix, generally the temperature is so high that all fats have become liquid. The cooling step in the A-units suitably is followed by one or more C-units, which are generally tubes containing a rotating impeller with pins, that works and mixes the emulsion obtained from the A-units. The crystallised fat provides structure and stability to the water-in-oil emulsion.

The premix containing a fat phase and an oil phase may be a oil-in-water emulsion. In that case the emulsion will be inverted into a water-in-oil emulsion in the subsequent process. Alternatively, the premix could be a water-in-oil emulsion already, and in that case inversion of the emulsion is not required anymore, only cooling and working of the emulsions in the subsequent process.

Alternatively, the water-in-oil emulsion in step a) could also be prepared using a process as described in WO 2010/069751 A1, wherein a fat mixture comprising fat powder and liquid oil are mixed with an aqueous phase.

In step b) a liquid mixture is made of a sucrose fatty acid ester and an oil. The temperature of the mixture is such that the sucrose fatty acid ester melts and easily can be mixed with the oil. In case the oil is not liquid at ambient temperature, then the mixing of the sucrose fatty acid ester and the oil can be done at such temperature that the oil becomes liquid. The temperature at which the oil and sucrose fatty acid ester melt are dependent on the specific oil and sucrose fatty acid ester, and is within the scope of the skilled person to determine. The temperature at which the aeration is done preferably ranges from 60° C. to 90° C., preferably from 65° C. to 85° C., preferably from 65° C. to 80° C. The mixture may also contain structuring fat, which is also melted during the mixing operation by increasing the temperature. Preferably at most 50% by weight of the total amount of oil in the mixture in step b) is structuring fat, preferably at most 35% by weight, more preferably at most 25% by weight.

The advantage of the aeration of the mixture of oil and sucrose fatty acid ester is that the sucrose fatty acid ester is optimally functional for aeration of the oil. The presence of water during aeration may reduce the functionality of sucrose fatty acid ester. Hence preferably the concentration of water in the mixture from step b) is less than 1%, preferably less than 0.5%, more preferably less than 0.25%, more preferably less than 0.1%. Most preferably the mixture from step b) is an anhydrous mixture, containing no free water. There may be some water present in the mixture from step b) which is dissolved in the oil phase or the sucrose fatty acid ester phase.

The HLB value of the sucrose fatty acid ester is an essential feature, and the sucrose fatty acid ester has a HLB value ranging from 1 to 7. Preferably the sucrose fatty acid ester has a HLB value ranging from 1 to 6, preferably from 1 to 5, preferably from 2 to 4. More preferred the HLB value is about 3, most preferred the HLB value is 3.

Preferably in step b) the concentration of sucrose fatty acid ester ranges from 1% to 25% by weight of the mixture of step b), preferably from 1% to 20% by weight, preferably from 2% to 15% by weight of the mixture of step b), preferably from 4% to 12% by weight of the mixture of step b). More preferred the concentration of sucrose fatty acid ester ranges from 5% to 10% by weight of the mixture of step b).

Preferably the sucrose fatty acid ester comprises one or more compounds chosen from the group consisting of sucrose tristearate, sucrose tetrastearate, sucrose pentastearate, sucrose tripalmitate, sucrose tetrapalmitate, and sucrose pentapalmitate. More preferred the sucrose fatty acid ester comprises one or more compounds chosen from the group consisting of sucrose tetrastearate, sucrose pentastearate, sucrose tetrapalmitate, and sucrose pentapalmitate. Preferably the sucrose fatty acid ester has an ester composition wherein the amount of mono-ester is maximally 40% of the total amount of ester, preferably maximally 30%, preferably maximally 20%, preferably maximally 15%.

Aeration in step b) may be done by any method commonly known for aeration, such as an Aerolatte, Kenwood mixer, or a Silverson mixer, which are generally batch mixers. Additionally, aeration may also be done in line, using a continuous process, such as an an Oakes mixer a Mondomixer, or a pin stirrer (like a C-unit) with nitrogen or other gas inlet. Preferably the overrun of the aerated mixture in step b) ranges from 10% to 500%, preferably from 20% to 400%, preferably from 40% to 250%.

In case a continuous system is used for aeration in step b), the ratio between the gas flow rate and the product flow rate for aeration will influence the overrun. Preferably the volume based ratio between the mixture of oil and sucrose fatty acid ester on the one hand and gas on the other hand ranges from 50:1 to 1:10 (volume by volume). More preferred the volume based ratio between the mixture of oil and sucrose fatty acid ester and gas ranges from 25:1 to 1:5 (volume by volume). The gas flow rate will be standardised at atmospheric pressure and 20° C. (normal liters per hour).

In step c) the mixtures from step a) and step b) are mixed, to produce an aerated water-in-oil emulsion. This mixing operation can be performed by contacting a flow of emulsion from step a) with a flow of aerated oil from step b) in a static mixer, and pumping this mixture through a stirred vessel to create a homogeneous mixture. The temperature at which the two flows are mixed preferably is such that the emulsion from step a) is not broken. Hence preferably the mixing temperature preferably ranges from 5 to 35° C., more preferred from 10 to 30° C., more preferred from 15 to 25° C.

The total fat level of the composition prepared according to the method of the invention is such that the composition comprises oil at a concentration ranging from 30% to 90% by weight of the total emulsion, preferably from 40% to 80% by weight of the total emulsion. Preferably the total fat level ranges from 50 to 75% by weight of the total emulsion.

The weight ratio of the flows from step a) and step b) can vary, to create the desired overrun and fat content of the composition in the form of an aerated water-in-oil emulsion. In case the desired overrun of the emulsion is low, then the amount of aerated oil phase from step b) is very low compared to the amount of emulsion from step a). Preferably the weight ratio between the mixture from step a) and step b) ranges from 10:1 to 1:3, preferably from 8:1 to 1:2, preferably from 6:1 to 1:1. This ratio can be used to influence the total fat level of the emulsion that is prepared, as well as the total overrun. The total concentration of sucrose fatty acid ester in the composition in the form of an aerated water-in-oil emulsion preferably ranges from 0.2% to 5% by weight of the composition, preferably from 0.5% to 4%, preferably from 0.7% to 2% by weight of the composition.

The overrun of the composition in the form of an emulsion prepared by the method of the invention ranges from 1% to 200%. Preferably the overrun of the composition in the form of an aerated water-in-oil emulsion, ranges from 10% to 100%, preferably from 20% to 80%, preferably from 25% to 60%.

An advantage of the method of the invention, is that the gas bubbles in the emulsion are relatively small and homogeneously distributed. Preferably at least 50% of the volume of the gas in the emulsion is made up by gas bubbles having a volume based equivalent diameter of maximally 60 micrometer, preferably maximally 50 micrometer. More preferred at least 50% of the volume of the gas in the emulsion is made up by gas bubbles having a volume based equivalent diameter of maximally 40 micrometer. Preferably at least 80% of the volume of the gas in the emulsion is made up by gas bubbles having a volume based equivalent diameter of maximally 70 micrometer, preferably maximally 60 micrometer, preferably maximally 50 micrometer. Preferably at least 90% of the volume of the gas in the emulsion is made up by gas bubbles having a volume based equivalent diameter of maximally 70 micrometer, preferably maximally 60 micrometer, preferably maximally 55 micrometer, preferably maximally 50 micrometer. Preferably at least 95% of the volume of the gas in the emulsion is made up by gas bubbles having a volume based equivalent diameter of maximally 80 micrometer, preferably maximally 70 micrometer, preferably maximally 60 micrometer, preferably maximally 55 micrometer. In the context of the present invention, the 'volume based equivalent diameter' of a gas bubble is the diameter of a sphere having the same volume as the relevant gas bubble, as the gas bubbles in a product may not be perfect spheres.

Preferably the gas bubbles have a volume average mean bubble size d4,3 of maximally 70 micrometer, preferably maximally 60 micrometer, preferably maximally 50 micrometer. Preferably the gas bubbles in the emulsion have a d4,3 value ranging from 10 to 70 micrometer, preferably from 10 to 60 micrometer, preferably from 10 to 50 micrometer. More preferably the gas bubbles in the emulsion have a d4,3 value ranging from 20 to 70 micrometer, preferably from 20 to 60 micrometer, preferably from 20 to 50 micrometer.

The advantage of the method of the invention is that the compositions that are prepared using the method of the invention are more stable against temperature fluctuations during storage than comparative compositions. Preferably, when an emulsion prepared according to the method of the invention is subjected to a temperature cycling regime (subsequently 24 hours at 5° C., 24 hours at 25° C., 24 hours at 5° C., and 2 hours at 10° C.), then preferably at least 50% of the volume of the gas in the emulsion is made up by gas bubbles having a volume based equivalent diameter of maximally 50 micrometer, preferably maximally 45 micrometer. Preferably in that case at least 80% of the volume of the gas in the emulsion is made up by gas bubbles having a volume based equivalent diameter of maximally 60 micrometer, preferably maximally 55 micrometer. Preferably in that case at least 90% of the volume of the gas in the emulsion is made up by gas bubbles having a volume based equivalent diameter of maximally 70 micrometer, preferably maximally 65 micrometer.

The composition prepared according to the method of the invention may be free from structuring fat. Alternatively and preferably the weight ratio between structuring fat and liquid oil in the composition prepared according to the method of the invention ranges from 1:100 to 50:100, preferably from 5:100 to 35:100, preferably from 5:100 to 25:100. This means that the total fat phase of the emulsion preferably comprises from 1% by weight to 50% by weight of structuring fat, and from 50% by weight to 99% by weight of liquid oil. More preferably the total fat phase of the emulsion preferably comprises from 5% by weight to 35% by weight of structuring fat, and consequently from 65% by weight to 95% by weight of liquid oil. More preferably the total fat phase of the emulsion preferably comprises from 5% by weight to 25% by weight of structuring fat, and consequently from 75% by weight to 95% by weight of liquid oil. With these ratios a fat-continuous emulsion can be produced which has the correct hardness and consistency. An emulsifier may be comprised in the liquid oil fraction. These preferred ratios between structuring fat and liquid oil are suitable for preparation of a spread.

Preferably the amount of structuring fat ranges from 1 to 35% by weight of the total fat phase of the emulsion, preferably ranges from 5 to 35% by weight of the total fat phase of the emulsion, preferably ranges from 5 to 30% by weight of the total fat phase of the emulsion, preferably ranges from 5 to 25% by weight of the total fat phase of the emulsion.

The emulsion that is produced by the method of the invention comprises an aqueous phase that is dispersed in small droplets in the continuous fat phase. Preferably the d3,3 value of the dispersed aqueous phase droplets is less than 10 micrometer, preferably less than 8 micrometer, preferably less than 6 micrometer. The distribution of the aqueous phase droplets preferably is narrow, meaning that the exp(sigma) is preferably maximally 2.5.

In case a spread is prepared according to the method of the invention, preferably the hardness is such that the spread is not too soft and not too hard, that it is easily spreadable on bread or toast or the like when taken from a refrigerator, and that it does not fall off a knife when trying to spread.

The hardness is usually expressed as the Stevens value, and this is normalised using a steel probe with a diameter of 6.35 millimeter, and the measurement is done at 5° C. The Stevens value at 5° C. preferably ranges from 80 to 500 gram, more preferred from 100 to 300 gram, using a steel probe with a diameter of 6.35 mm. The device used for the measurement is usually a Stevens penetrometer, for example a Brookfield LFRA Texture Analyser (LFRA 1500), ex Brookfield Engineering Labs, UK. The probe is pushed into the product at a speed of 2 mm/s, with a trigger force of 5 gram from a distance of 10 mm. These ranges are suitable for an emulsion in the form of a spread.

The emulsions prepared according to the method of the invention can be used for shallow frying. The advantage of the emulsions prepared according to the method, is that the spattering during heating of the emulsion in a pan is reduced (the SV1 value), as compared to an emulsion without air or compared to an aerated emulsion that is prepared according to a conventional process. The spattering values SV1 and SV2 are as defined herein below. Hence preferably the emulsions prepared according to the method of the invention have a SV1 value as defined herein of preferably at least 5, more preferred at least 7, more preferred at least 8, and most preferred at least 9.

Composition and Use According to the Invention

In a second aspect the present invention provides a composition in the form of an aerated water-in-oil emulsion, comprising a sucrose fatty acid ester having a HLB value ranging from 1 to 7 at a concentration ranging from 0.2% to 5% based on the weight of the composition;

wherein the composition comprises oil at a concentration ranging from 30% to 90% by weight of the composition;

wherein the composition has an overrun ranging from 1% to 200%; and wherein at least 50% of the volume of the gas is made up by gas bubbles having a volume based equivalent diameter of maximally 60 micrometer, preferably maximally 50 micrometer.

The preferred aspects of the composition prepared according to the first aspect of the invention, are applicable to the second and third aspects of the invention mutatis mutandis.

Preferably the composition of the invention is an edible composition in the form of an aerated water-in-oil emulsion. Preferably the composition is in the form of a spread. A spread means that the emulsions can be spread using a knife on a solid or semi-solid surface like bread or toast when taken from a refrigerator.

The HLB value of the sucrose fatty acid ester is an essential feature, and the sucrose fatty acid ester has a HLB value ranging from 1 to 7. Preferably the sucrose fatty acid ester has a HLB value ranging from 1 to 6, preferably from 1 to 5, preferably from 2 to 4. More preferred the HLB value is about 3, most preferred the HLB value is 3.

Preferably the sucrose fatty acid ester comprises one or more compounds chosen from the group consisting of sucrose tristearate, sucrose tetrastearate, sucrose pentastearate, sucrose tripalmitate, sucrose tetrapalmitate, and sucrose pentapalmitate. More preferred the sucrose fatty acid ester comprises one or more compounds chosen from the group consisting of sucrose tetrastearate, sucrose pentastearate, sucrose tetrapalmitate, and sucrose pentapalmitate. Preferably the sucrose fatty acid ester has an ester composition wherein the amount of mono-ester is maximally 40% of the total amount of ester, preferably maximally 30%, preferably maximally 20%, preferably maximally 15%.

Preferably the overrun of the aerated mixture in step b) ranges from 10% to 500%, preferably from 20% to 400%, preferably from 40% to 250%.

The total fat level of the composition according to the invention is such that the composition comprises oil at a concentration ranging from 30% to 90% by weight of the total emulsion, preferably from 40% to 80% by weight of the total emulsion. Preferably the total fat level ranges from 50 to 75% by weight of the total emulsion.

The total concentration of sucrose fatty acid ester in the composition in the form of an aerated water-in-oil emulsion ranges from 0.2% to 5% by weight of the composition, preferably from 0.5% to 4%, preferably from 0.7% to 2% by weight of the composition.

The overrun of the composition according to the invention ranges from 1% to 200%. Preferably the overrun of the composition in the form of an aerated water-in-oil emulsion, ranges from 10% to 100%, preferably from 20% to 80%, preferably from 25% to 60%.

An advantage of the composition of the invention, is that the gas bubbles in the emulsion are relatively small and homogeneously distributed. Preferably at least 50% of the volume of the gas in the emulsion is made up by gas bubbles having a volume based equivalent diameter of maximally 60 micrometer, preferably maximally 50 micrometer. More preferred at least 50% of the volume of the gas in the emulsion is made up by gas bubbles having a volume based equivalent diameter of maximally 40 micrometer. Preferably at least 80% of the volume of the gas in the emulsion is made up by gas bubbles having a volume based equivalent diameter of maximally 70 micrometer, preferably maximally 60 micrometer, preferably maximally 50 micrometer. Preferably at least 90% of the volume of the gas in the emulsion is made up by gas bubbles having a volume based equivalent diameter of maximally 70 micrometer, preferably maximally 60 micrometer, preferably maximally 55 micrometer, preferably maximally 50 micrometer. Preferably at least 95% of the volume of the gas in the emulsion is made up by gas bubbles having a volume based equivalent diameter of maximally 80 micrometer, preferably maximally 70 micrometer, preferably maximally 60 micrometer, preferably maximally 55 micrometer. In the context of the present invention, the 'volume based equivalent diameter' of a gas bubble is the diameter of a sphere having the same volume as the relevant gas bubble.

Preferably the gas bubbles have a volume average mean bubble size d4,3 of maximally 70 micrometer, preferably maximally 60 micrometer, preferably maximally 50 micrometer. Preferably the gas bubbles in the emulsion have a d4,3 value ranging from 10 to 70 micrometer, preferably from 10 to 60 micrometer, preferably from 10 to 50 micrometer. More preferably the gas bubbles in the emulsion have a d4,3 value ranging from 20 to 70 micrometer, preferably from 20 to 60 micrometer, preferably from 20 to 50 micrometer.

The advantage of the composition of the invention is that the compositions are more stable against temperature fluctuations during storage than comparative compositions. Preferably, when an emulsion according to the invention is subjected to a temperature cycling regime (subsequently 24 hours at 5° C., 24 hours at 25° C., 24 hours at 5° C., and 2 hours at 10° C.), then preferably at least 50% of the volume of the gas in the emulsion is made up by gas bubbles having a volume based equivalent diameter of maximally 50 micrometer, preferably maximally 45 micrometer. Preferably in that case at least 80% of the volume of the gas in the emulsion is made up by gas bubbles having a volume based equivalent diameter of maximally 60 micrometer, preferably maximally 55 micrometer. Preferably in that case at least 90% of the volume of the gas in the emulsion is made up by gas bubbles having a volume based equivalent diameter of maximally 70 micrometer, preferably maximally 65 micrometer.

The composition according to the invention may be free from structuring fat. Alternatively and preferably the weight ratio between structuring fat and liquid oil in the composition prepared according to the method of the invention ranges from 1:100 to 50:100, preferably from 5:100 to 35:100, preferably from 5:100 to 25:100. This means that the total fat phase of the emulsion preferably comprises from 1% by weight to 50% by weight of structuring fat, and from 50% by weight to 99% by weight of liquid oil. More preferably the total fat phase of the emulsion preferably comprises from 5% by weight to 35% by weight of structuring fat, and consequently from 65% by weight to 95% by weight of liquid oil. More preferably the total fat phase of the emulsion preferably comprises from 5% by weight to 25% by weight of structuring fat, and consequently from 75% by weight to 95% by weight of liquid oil. With these ratios a fat-continuous emulsion can be produced which has the correct hardness and consistency. An emulsifier may be comprised in the liquid oil fraction. These preferred ratios between structuring fat and liquid oil are suitable for preparation of a spread.

Preferably the amount of structuring fat ranges from 1 to 35% by weight of the total fat phase of the emulsion, preferably ranges from 5 to 35% by weight of the total fat phase of the emulsion, preferably ranges from 5 to 30% by weight of the total fat phase of the emulsion, preferably ranges from 5 to 25% by weight of the total fat phase of the emulsion.

The advantage of the emulsion according to the second aspect of the invention is that the amount of structuring fat is relatively low, while the hardness of the emulsion is still within acceptable limits. As explained herein before, the structuring fat is required to give structure to the emulsion. On the other hand, structuring fat mainly contains saturated fatty acids, and for the health of the consumer it would be better to replace saturated fatty acids by monounsaturated or polyunsaturated fatty acids. Hence there is a balance between the amount of structuring fat for health purposes and for structuring purposes.

The composition according to the invention comprises an aqueous phase that is dispersed in small droplets in the continuous fat phase. Preferably the d3,3 value of the dispersed aqueous phase droplets is less than 10 micrometer, preferably less than 8 micrometer, preferably less than 6 micrometer. The distribution of the aqueous phase droplets preferably is narrow, meaning that the exp(sigma) is preferably maximally 2.5.

Preferably the hardness is such that the spread is not too soft and not too hard, that it is easily spreadable on bread or toast or the like when taken from a refrigerator, and that it does not fall off a knife when trying to spread. The Stevens value at 5° C. preferably ranges from 80 to 500 gram, more preferred from 100 to 300 gram, using a steel probe with a diameter of 6.35 mm. These ranges are suitable for an emulsion in the form of a spread.

The compositions according to the invention can be used for shallow frying. The advantage of the emulsions prepared according to the method, is that the spattering during heating of the emulsion in a pan is reduced (the SV1 value), as compared to an emulsion without air or compared to an aerated emulsion that is prepared according to a conventional process. The spattering values SV1 and SV2 are as defined herein below. Hence preferably the compositions according to the invention have a SV1 value as defined herein of preferably at least 5, more preferred at least 7, more preferred at least 8, and most preferred at least 9.

In a third aspect the present invention provides use of a composition prepared according to the method of the first aspect of the invention or according to the second aspect of the invention for shallow frying of food products or for cooking or baking of food products.

Use of the composition for shallow frying of food products has the advantage that spattering of the emulsion is reduced, when the composition is heated in a pan for shallow frying of foods or food ingredients.

Use of the composition in cooking or baking of food products has the advantage that an aerated dough for making cakes can be obtained, and that this may lead to using less other gas-forming agents (such as bicarbonate and baker's yeast) to provide an aerated baked product. Moreover the use of the sucrose fatty acid ester in the emulsion provides a firmer baked product as compared to a baked product prepared using an emulsion without sucrose fatty acid ester.

EXAMPLES

Figure 1:
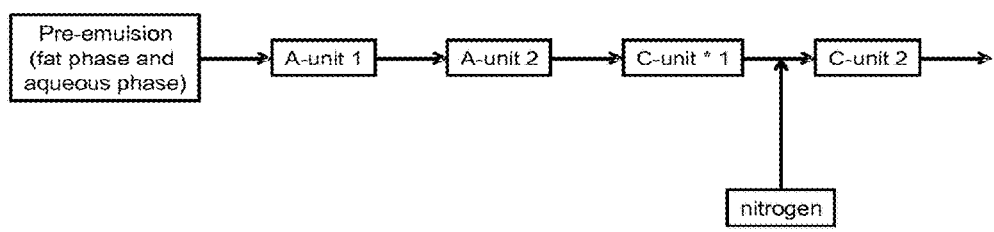
FIG. 1: Schematic process scheme for making a water-in-oil emulsion.

The following non-limiting examples illustrate the present invention.

Materials and Methodology

Raw Materials Used

Sucrose fatty acid esters used, all supplied by Mitsubishi-Kagaku Foods Corporation (Tokyo, Japan), all analytical data obtained from supplier:
Ryoto S070: HLB<1, about 100% di-, tri- and polyester;
Ryoto S170: HLB about 1, about 100% di-, tri- and polyester;
Ryoto S270: HLB about 2, about 10% mono-ester, and about 90% di-, tri- and polyester;
Ryoto S370: HLB about 3, about 20% mono-ester, and about 80% di-, tri- and polyester;
Ryoto S570: HLB about 5, about 30% mono-ester, and about 70% di-, tri- and polyester;
Ryoto S770: HLB about 7, about 40% mono-ester, and about 60% di-, tri- and polyester;
Ryoto S970: HLB about 9, about 50% mono-ester, and about 50% di-, tri- and polyester.

All these esters contain at least 70% of the fatty acids is stearic acid.

Typical ester analysis based on HLB value:
HLB 1: ~1% mono, ~4% di, ~7% tri, ~13% tetra, ~28% penta, ~24% hexa, ~23% hepta and higher.
HLB 3: ~18% mono, ~32% di, ~29% tri, ~16% tetra, ~5% penta and higher.
HLB 7: ~37% mono, ~45% di, ~16% tri, ~2% tetra and higher.

Other Raw Materials
Structuring fat: a mixture of interesterified oils: 65% of stearine fraction of dry fractioned palm oil with a melting point of 65° C., and 35% of palm kernel oil (65dfPOs52mp/35PK); supplier Sime Darby Unimills (Zwijndrecht, Netherlands);
Sunflower oil, supplier Sime Darby Unimills (Zwijndrecht, Netherlands);
Coconut oil, supplier Brenntag Eurochem GmbH (Duisburg, Germany);
Cocoa butter, supplier Barry Callebaut (Zundert, Netherlands);
Monoglyceride: Dimodan HP-K, supplier Danisco (Copenhagen, Denmark);
Lecithin: sunflower lecithin, SunlecM, supplier Sime Darby Unimills (Zwijndrecht, Netherlands);
PGPR: emulsifier polyglycerol polyricinoleate, supplier Kerry Ingredients & Flavours (Zwijndrecht, The Netherlands);
Beta-carotene: 0.4% dispersion in edible oil; supplier Allied Biotech Corp., (Karlsruhe, Germany);
Water: local tap water;
Salt: sodium chloride, supplier Brenntag Eurochem GmbH (Duisburg, Germany);
Starch: Purity SUV; supplier National Starch (Manchester, United Kingdom);
Sorbate: potassium sorbate, supplier Reipu Europe (Denmark);
Sweet whey powder; supplier Lactalis (France).

Primary and Secondary Spattering Tests of Emulsions

Primary spattering (SV1) is assessed under standardised conditions in which an aliquot of a food product is heated in a glass dish and the amount of fat spattered onto a sheet of paper held above the dish is assessed after the water content of the food product has been evaporated by heating.

Secondary spattering (SV2) is assessed under standardised conditions in which the amount of fat spattered onto a sheet of paper held above the dish is assessed after injection of a quantity of 10 milliliter water into the dish.

In assessment of both primary and secondary spattering values, 25 gram food product is heated in a 15 cm diameter glass bowl on an electric plate to about 205° C. The oil or fat that spatters out by force of expanding evaporating water droplets is caught on a sheet of paper situated at 25 cm above the pan (SV1 test). Subsequently a quantity of 10 milliliter water is poured into the bowl and again the fat that spatters out of the glass bowl by force of expanding evaporating water droplets is caught on a sheet of paper situated above the pan (SV2 test).

The images on the paper sheets as obtained are compared with a set of standard pictures, numbered 0-10, whereby the number of the best resembling picture is recorded as the spattering value. 10 indicates no spattering and 0 indicates very high spattering. The standard scoring method is as indicated in table 1.

TABLE 1

Standard scoring table for spattering values SV1 and SV2

| Score | Comments |
|---|---|
| 10 | Excellent |
| 8 | Good |
| 6 | Passable |
| 4 | Unsatisfactory for SV1, almost passable for SV2 |
| 2 | Very poor |

Typical results for household margarines (~80 wt % fat) are 8.5 for primary spattering (SV1) and 4.6 for secondary spattering (SV2) under the conditions of the above mentioned test.

All tests are done in duplicate, yielding two measurement values, which are averaged to yield one result.

Water Droplet Size and Water Droplet Size Distribution in Emulsions

Water droplet size and water droplet size distribution are determined using standardised NMR equipment. A Bruker magnet with a field of 0.47 Tesla (20 MHz proton frequency) with an air gap of 25 mm is used (NMR Spectrometer Bruker Minispec MQ20 Grad, ex Bruker Optik GmbH, Germany). The NMR signal (echo height) of the protons of the water in a water-in-oil emulsion is measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure (which uses the log-normal droplet size distribution) the parameters of the water droplet size distribution d3,3 (volume weighted geometric mean diameter) and sigma or exp(sigma) (measures for distribution width) are calculated.

The droplet size of the spread is measured, according to the above described procedure, of a spread stabilized at 5° C. right after production for one week. This gives the d3,3 after stabilization at 5° C.

Hardness and Spreadability of Emulsions

Stevens values give an indication about the hardness (also called firmness) of a product. The Stevens value is determined according to the following protocol.

Freshly prepared products are stabilized at 5° C. The hardness of the product is measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Spreadability is determined according to the following protocol. A flexible palette knife is used to spread a small amount of the spread onto fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

X-Ray Tomography of Emulsions

Emulsions were imaged with a SkyScan 1172-A high-resolution desktop μCT system. An XRT scan creates a series of x-ray photographs (projection images) of an object placed on a rotating stage. The distance between the object and the X-ray source defines the magnification of the projection. Magnifying the object allows to increase the spatial resolution. The final resolution also depends on the detector. The detector has a fixed number of pixels and each pixel has a well-defined size. The actual resolution is limited to about 2 micrometer.

All (2D) projection images are taken from slightly different angles and are stored on a disk, and later used for a so called tomographic reconstruction. This is a mathematical procedure to obtain a stack of cross-sectional images, which make-up a 3D representation of the object. Such a stack of images can be visualized using 3D rendering software. The 3D images can be used to determine gas bubble sizes.

The SkyScan NRECON software (V1.6.4.8) is being used for reconstruction of the 2D projection images into a stack of horizontal slices yielding a 3D model. The images can be viewed, processed and analysed using image processing software (CTAn (V1.11.10) from SkyScan and Avizo Fire V7.0 from the Visualization Sciences Group).

For analysis of the emulsions, a removable plastic tube having an internal diameter of 7 millimeter and a height of about 6 centimeter is filled with the emulsion to be measured. The tomography results in a 3-D structure, that can be displayed in different planes. In FIG. 3 to FIG. 10 we show a horizontal and a vertical slice of each sample, a horizontal slice having a width of 7 mm (the internal diameter of the tube), and a vertical slice having a width of 7 mm (the internal diameter of the tube) and a height of about 4 mm. From the 3-D bubble distribution, an estimate of the gas bubble size in the sample can be made. By making images before and after storage of emulsions (while the storage temperature is varied), the influence of the storage on the gas bubbles can be investigated.

After reconstruction of the projection images, the resulting 3D stack of images were binarised using a threshold value such that the overrun obtained in the image analysis matched that of the product. Subsequently, bubbles that were apparently coalesced or touching each other (e.g. because the lamella between two bubbles was too thin to be identified during the thresholding process) were separated in 3D by using a watershed transform of the Euclidean distance map of the inverted binary images (using Matlab/DipLib software).

The volume of the somewhat irregular bubbles were determined by adding up the voxels (i.e. 3d pixels), and an equivalent bubble diameter was determined by equating the volume of the bubble with an hypothetical sphere (having the equivalent bubble diameter) with the same volume. The bubble size distribution was weighted by the volume of the bubbles (cf. d4.3).

Example 1: Influence of HLB Value of Sucrose Fatty Acid Ester on Foaming of Oil

In order to study the effect of HLB of sucrose fatty acid ester on aeration, stearate esters with different esterification degrees (S070 to S970, the HLB value increases from <1 to 9) were investigated by aerating sunflower oil, or cocoa butter, or coconut oil at 65° C. Sucrose esters (S070 to S970) all have a similar melting temperature around 61° C., and they were mixed with sunflower oil (at a concentration of 10 wt %) by heating a mixture of 100 mL of oil and emulsifier solution in a beaker (400 mL) up to 70° C. in an oven. The mix was then equilibrated for 1 hour at 70° C. Aeration was done using a hand held whisk (Krups), at the maximum speed for 5 minutes at 70° C. The overrun as function of the HLB value and their residues (i.e. non-soluble material) in the oils are listed in the following table.

TABLE 2

The overrun and residue of different emulsifiers in sunflower oil, cocoa butter, or coconut oil at 10 wt % concentration of the sucrose fatty acid ester.

| Emulsifier | S070 | S170 | S270 | S370 | S570 | S770 | S970 |
|---|---|---|---|---|---|---|---|
| HLB | <1 | 1 | 2 | 3 | 5 | 7 | 9 |
| Sunflower oil | | | | | | | |
| Residue [wt %] at 70° C. | 0 | 0 | 1.66 | 2.91 | 7.57 | ~10 | n/a* |
| Aeration overrun [%] | 8 | 45 | 180 | 290 | 100 | ~0 | n/a |
| Cocoa butter | | | | | | | |
| Residue [wt %] at 70° C. | n/a | 0 | 8 | 1.2 | 5.0 | 8.0 | 8.5 |
| Aeration overrun [%] | n/a | 5 | 186 | 211 | 139 | 17 | 1 |
| Coconut oil | | | | | | | |
| Residue [wt %] at 70° C. | n/a | 0 | 1.0 | 1.6 | 5.0 | n/a | 8.0 |
| Aeration overrun [%] | n/a | 0 | 82 | 198 | 48 | n/a | 0 |

*'n/a' is not measured

With the increase of HLB value the foaming capability increased, reaching a maximum overrun for S370 for all oils. When HLB reaches 5 for S570, the aeration capability begins to decrease. The residues in the oils increase with the increase of HLB value, meaning that the amount of material that does not dissolve in oil increases. It depends on the actual oil what the maximum HLB value of the sucrose fatty acid ester that still works for aeration.

Example 2: Influence of Concentration of Sucrose Fatty Acid Ester on Aeration of Oil The concentration of sucrose fatty acid ester Ryoto S370 was varied in order to investigate the influence on the overrun of aerated oil. The following procedure was applied.
1. 50 g samples with different concentrations of S370 in sunflower oil were heated in an oven at 70° C. for 2 hours;
2. The samples were directly aerated at 70° using Ultra Turrax T 25 (supplier: IKA®-Werke GmbH & Co. KG, Staufen, Germany), during two minutes at a speed of 13,500 min$^{-1}$.
3. The experiments were done in triplicate.

The following results were obtained (average of the triplicates):

TABLE 3

The overrun in sunflower oil, as function of concentration of sucrose fatty acid ester Ryoto S370.

| Concentration Ryoto S370 [wt %] | overrun [%] |
|---|---|
| 2 | 4.5 |
| 5 | 22.9 |
| 10 | 36.9 |
| 15 | 62.6 |
| 20 | 82.6 |
| 25 | 92.8 |
| 30 | 91.0 |

This shows that in this test with a batch system, the overrun increased until a maximum at 25 wt % was achieved.

Additionally tests with Ryoto S370 in sunflower oil were performed in a continuous flow system, wherein a flow of oil combined with sucrose fatty acid ester is continuously aerated by input of a continuous nitrogen flow. The mixing device was a C-unit with a volume of 100 mL, equipped with a pin stirrer (similar as the aeration 'C-unit a' used in example 4 (Table 8, Table 11)). Five parameters were varied in these tests:
1. concentration S370 in oil (2, 5, 10 wt %);
2. rotation speed of C-unit (500, 1500, 2500 rpm);
3. aeration temperature (65, 70, 80° C.);
4. nitrogen gas flow rate (2, 7.5, 15 normal L/h);
5. oil/sucrose fatty acid ester flow rate (2, 4, 7.5 L/h).

From these experiments follows that the parameters that determine the overrun the most, are the concentration of sucrose fatty acid ester in oil, and the gas flow rate (the latter especially in volume ratio to the oil/sucrose fatty acid ester flow rate). The other 3 parameters only have a minor influence on the overrun that can be obtained. As an example, the following data are presented, combining overrun data for various rotation speeds, aeration temperatures, and rotation speeds. All measurements are done in duplicate, and the average overrun of these two measurements is presented as well.

TABLE 4

Overrun (in duplicate) as function of concentration of Ryoto S370 in sunflower oil, and volume ratio oil-SFAE to nitrogen, rotation speed, temperature,

| concentration of S370 in oil [wt %] | rotation speed C-unit [min$^{-1}$] | temperature [° C.] | oil-SFAE flow rate [L/h] | gas flow rate [N L/h] | volume ratio nitrogen to oil-SFAE mix [vol/vol] | overrun 1 [%] | overrun 2 [%] | average overrun [%] |
|---|---|---|---|---|---|---|---|---|
| 5.0 | 500 | 70 | 7.5 | 2.0 | 0.27 | 25 | 31 | 28 |
| 2.0 | 2500 | 70 | 4.0 | 2.0 | 0.50 | 41 | 43 | 42 |
| 10.0 | 1500 | 80 | 4.0 | 2.0 | 0.50 | 87 | 70 | 79 |
| 2.0 | 500 | 80 | 7.5 | 7.5 | 1.00 | 112 | 88 | 100 |
| 5.0 | 2500 | 80 | 2.0 | 2.0 | 1.00 | 101 | 104 | 103 |
| 2.0 | 1500 | 70 | 4.0 | 7.5 | 1.88 | 82 | 98 | 90 |
| 2.0 | 2500 | 80 | 7.5 | 15.0 | 2.00 | 103 | 87 | 95 |
| 5.0 | 1500 | 70 | 7.5 | 15.0 | 2.00 | 110 | 116 | 113 |
| 5.0 | 1500 | 80 | 2.0 | 7.5 | 3.75 | 200 | 200 | 200 |
| 10.0 | 500 | 80 | 4.0 | 15.0 | 3.75 | 364 | 329 | 346 |
| 10.0 | 2500 | 70 | 2.0 | 7.5 | 3.75 | 248 | 395 | 321 |
| 10.0 | 500 | 70 | 2.0 | 15.0 | 7.50 | 315 | 446 | 381 |

These data show that the overrun as measured here can reach values up to nearly 400%. The highest overruns are obtained when the volume ratio between oil-sucrose fatty acid ester and gas is relatively high.

Example 3: Influence of Water on Aeration of Oil Using Sucrose Fatty Acid Ester

To investigate the influence of the presence of water on aeration of oil using sucrose fatty acid ester Ryoto S370, an experiment was conducted wherein water was added before and after aeration. The following procedure was applied. A 10 wt % solution of Ryoto S370 was made in sunflower oil, filtered and heated in an oven at 70° C. Five different samples were produced, based on the oil-sucrose fatty acid ester mixture at 70° C.:
1. A sample that was aerated, without water added.
2. A sample to which 20 wt % water at 20° C. was added and mixed and then aerated.

3. A sample to which 20 wt % water at 70° C. was added and mixed and then aerated.
4. A sample that was aerated first, followed by addition and mixing of 20 wt % water at 20° C.
5. A sample that was aerated first, followed by addition and mixing of 20 wt % water at 70° C.

The aeration was done in all 5 samples using Ultra Turrax T 25 (supplier: IKA®-Werke GmbH & Co. KG, Staufen, Germany), during one minute at a speed of 13,500 min$^{-1}$. The overruns that were measured are indicated in the following table.

TABLE 5

The overrun in sunflower oil, as function of concentration of sucrose fatty acid ester Ryoto S370.

| sample# [wt %] | overrun [%] |
|---|---|
| 1 (no water) | 52.6 |
| 2 (water 20° C. pre-added) | 33.3 |
| 3 (water 70° C. pre-added) | 22.2 |
| 4 (water 20° C. post-added) | 56.4 |
| 5 (water 70° C. post-added) | 61.1 |

These data show that addition of water to oil prior to aeration reduces the overrun that can be obtained. This shows that the efficiency of the sucrose fatty acid ester is reduced when water is present during aeration. This shows that aeration of an oil separately from the emulsion to which it is added is advantageous (which is according to the invention), as the sucrose fatty acid ester contributes more to achieve a high overrun.

Example 4: Preparation of Emulsions

Figure 2:
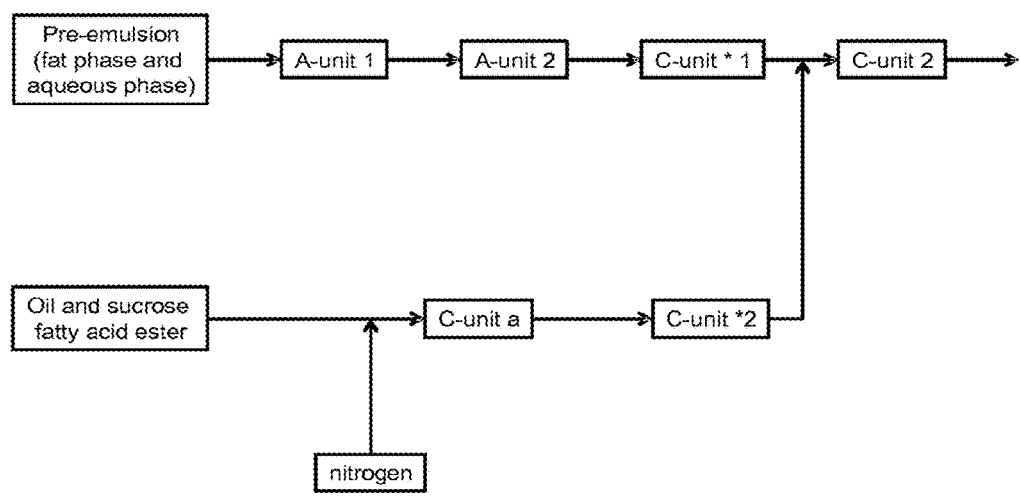
FIG. 2: Schematic process scheme for making aerated water-in-oil emulsion, according to the invention.
Figure 3:
FIG. 3: X-ray tomography images of emulsion #332 (see Table 6);
left fresh after production, right after temperature cycling;
top horizontal slice (tube wall is shown as the outer circle); bottom vertical slice (tube wall is shown left and right of the bottom images); image width 7 millimeter;
the circles that are visible within the top images are artefacts created by the image analysis software, as the contrast difference within the images are very small (non-aerated emulsions).
Figure 4:
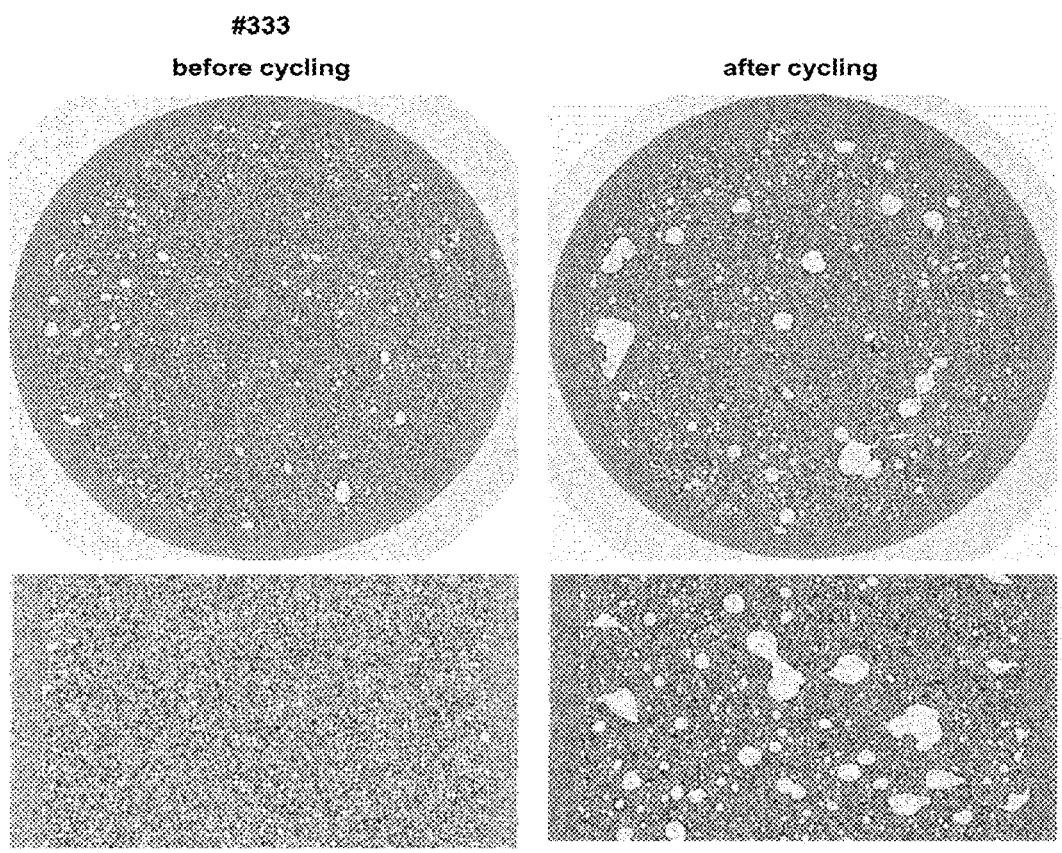
FIG. 4: X-ray tomography images of emulsion #333 (see Table 6);
left fresh after production, right after temperature cycling;
top horizontal slice (tube wall is shown as the outer circle); bottom vertical slice (tube wall is shown left and right of the bottom images); image width 7 millimeter.
Figure 5:
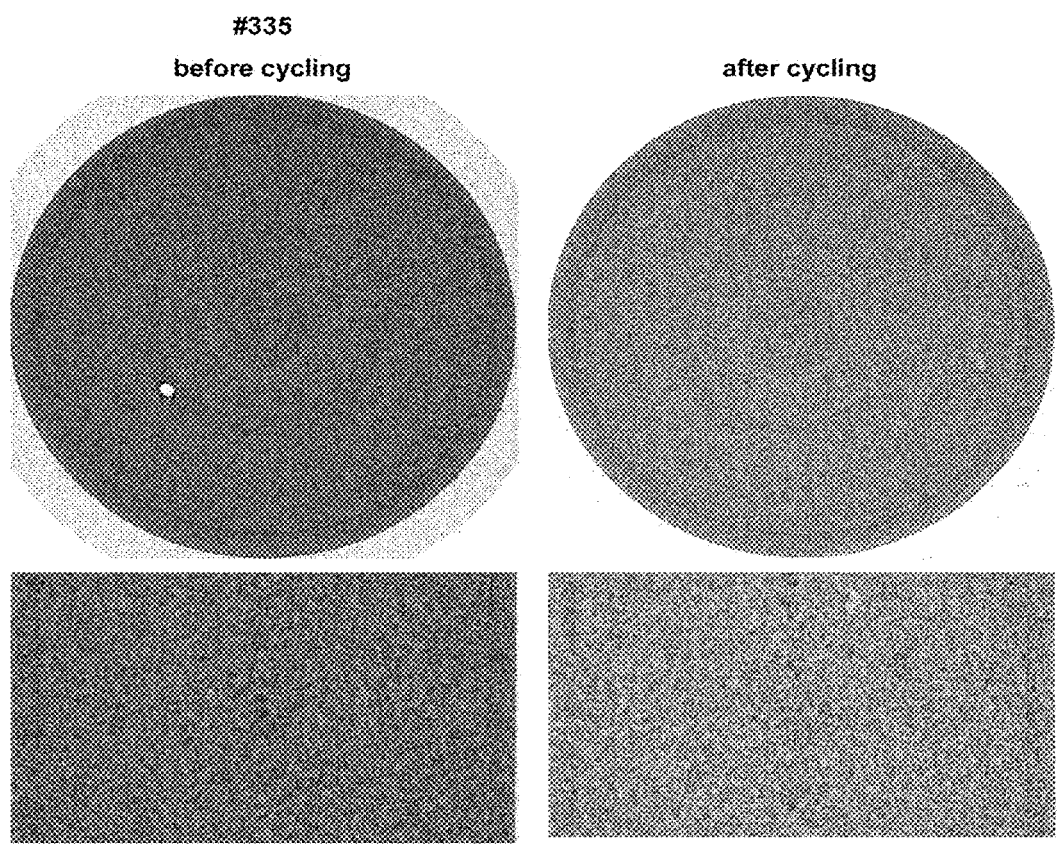
FIG. 5: X-ray tomography images of emulsion #335 (see Table 6);
left fresh after production, right after temperature cycling;
top horizontal slice (tube wall is shown as the outer circle); bottom vertical slice (tube wall is shown left and right of the bottom images); image width 7 millimeter;
the circles that are visible within the top images are artefacts created by the image analysis software, as the contrast difference within the images are very small (non-aerated emulsions).
Figure 6:
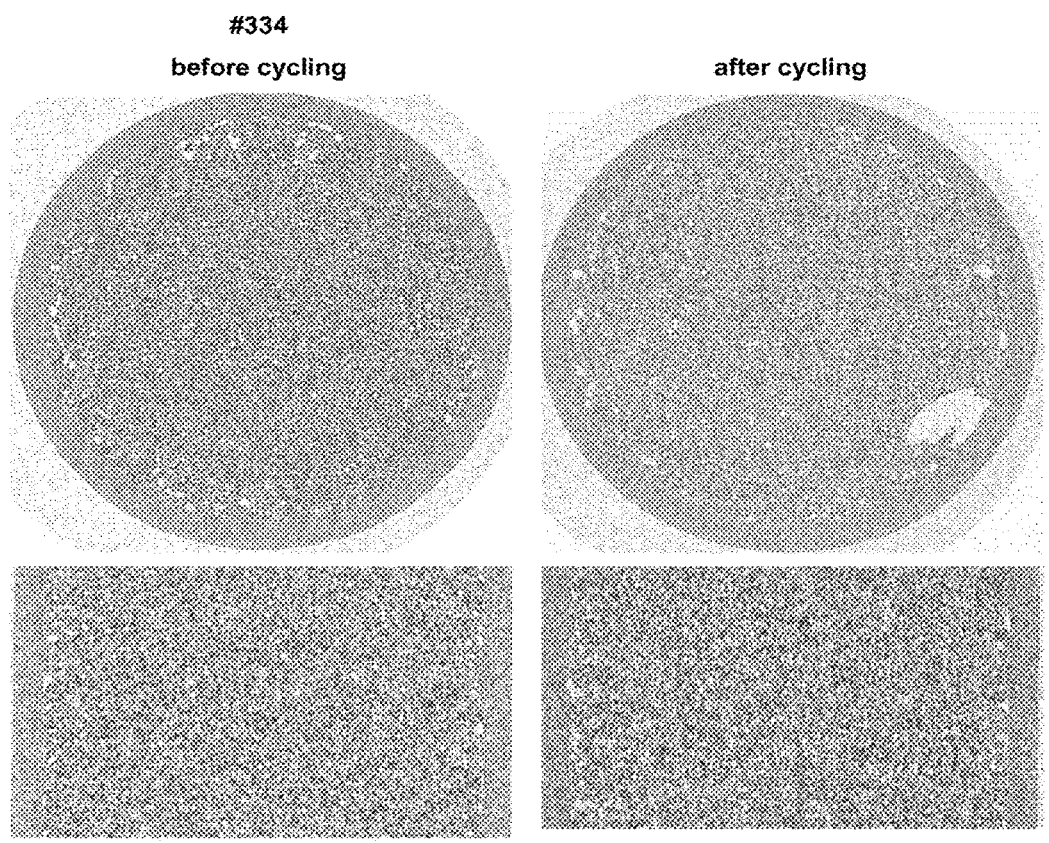
FIG. 6: X-ray tomography images of emulsion #334 (see Table 6);
left fresh after production, right after temperature cycling;
top horizontal slice (tube wall is shown as the outer circle); bottom vertical slice (tube wall is shown left and right of the bottom images); image width 7 millimeter.
Figure 7:
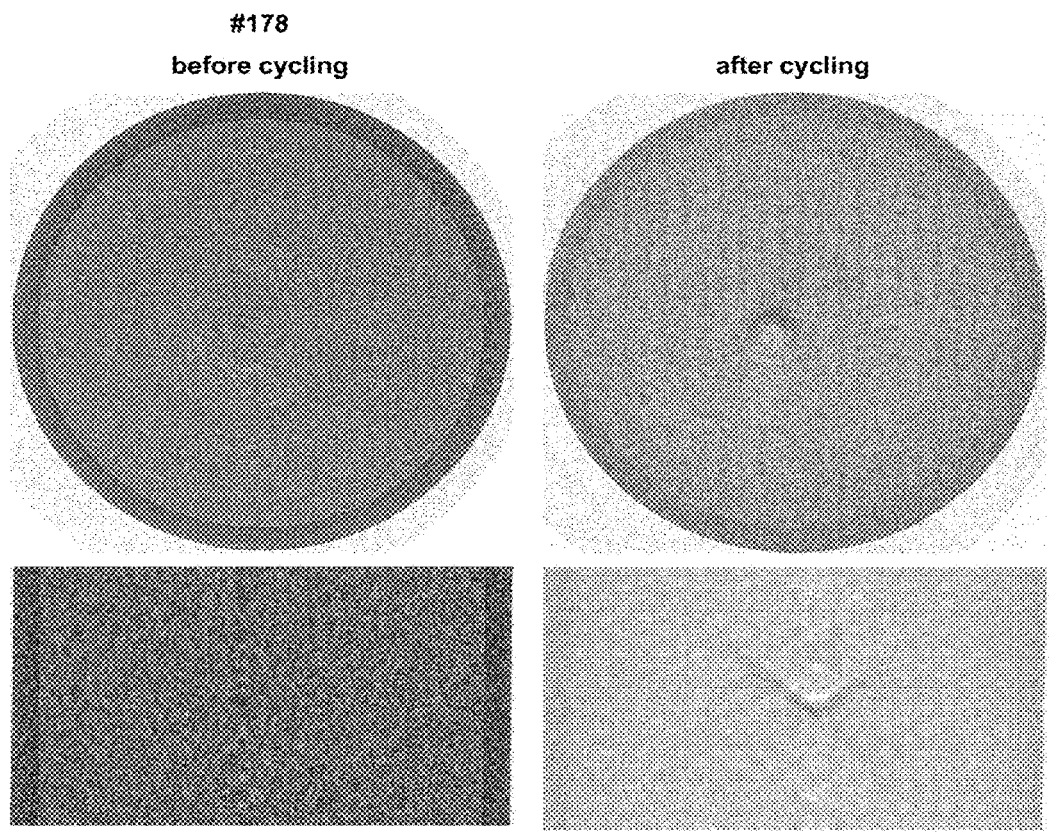
FIG. 7: X-ray tomography images of emulsion #178 (see Table 9);
left fresh after production, right after temperature cycling;
top horizontal slice (tube wall is shown as the outer circle); bottom vertical slice (tube wall is shown left and right of the bottom images); image width 7 millimeter; the circles that are visible within the top images are artefacts created by the image analysis software, as the contrast difference within the images are very small (non-aerated emulsions);
the artifact in the middle of the bottom right image is caused by not completely well adjusted flat field correction.
Figure 8:
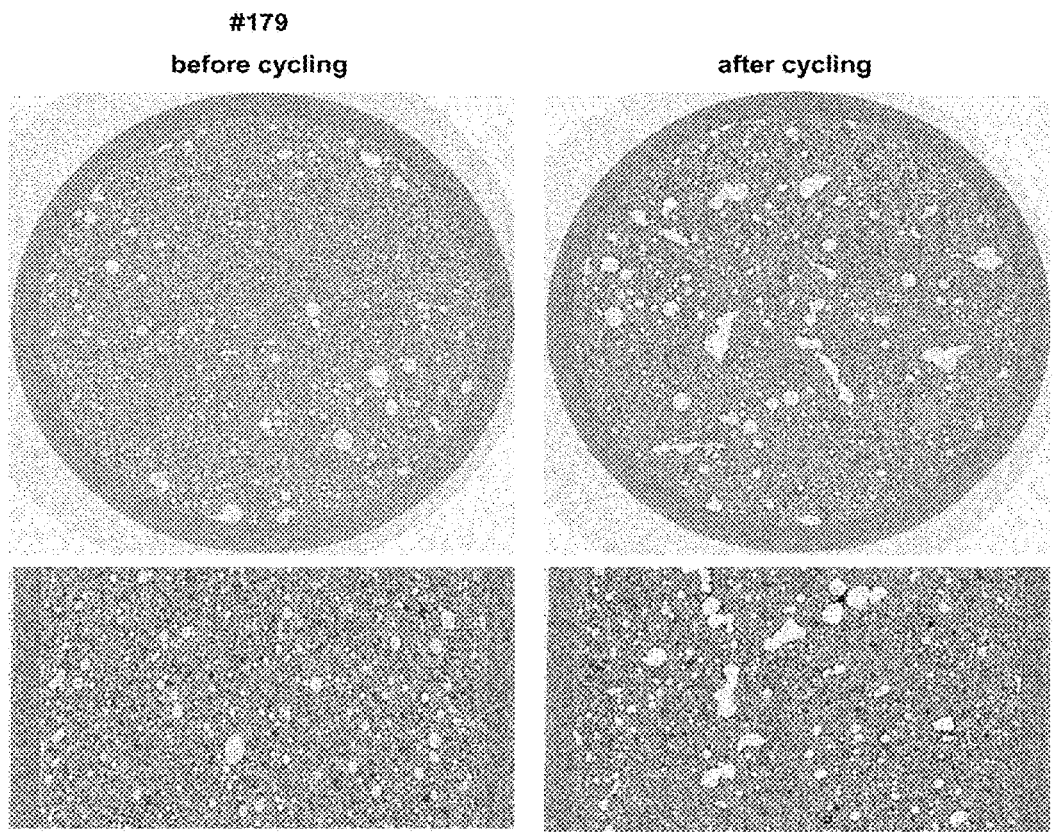
FIG. 8: X-ray tomography images of emulsion #179 (see Table 9);
left fresh after production, right after temperature cycling;
top horizontal slice (tube wall is shown as the outer circle); bottom vertical slice (tube wall is shown left and right of the bottom images); image width 7 millimeter.
Figure 9:
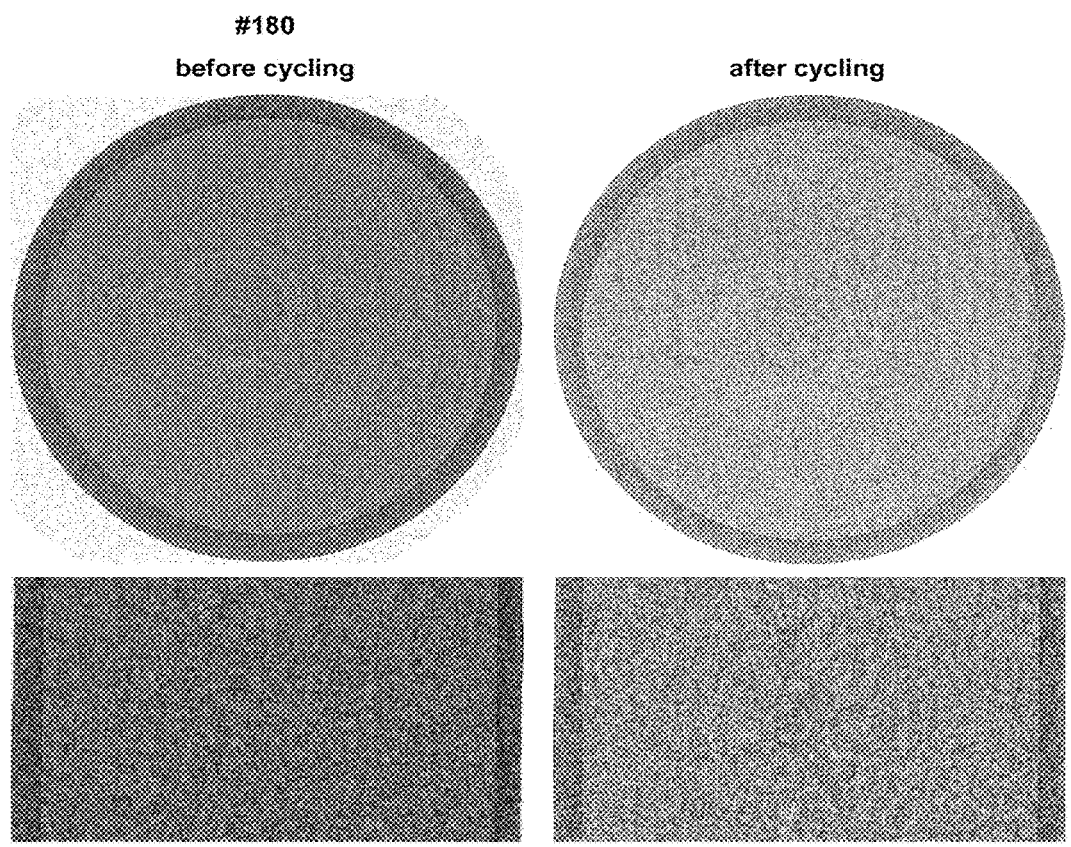
FIG. 9: X-ray tomography images of emulsion #180 (see Table 9); left fresh after production, right after temperature cycling;
top horizontal slice (tube wall is shown as the outer circle); bottom vertical slice (tube wall is shown left and right of the bottom images); image width 7 millimeter;
the circles that are visible within the top images are artefacts created by the image analysis software, as the contrast difference within the images are very small (non-aerated emulsions).
Figure 10:
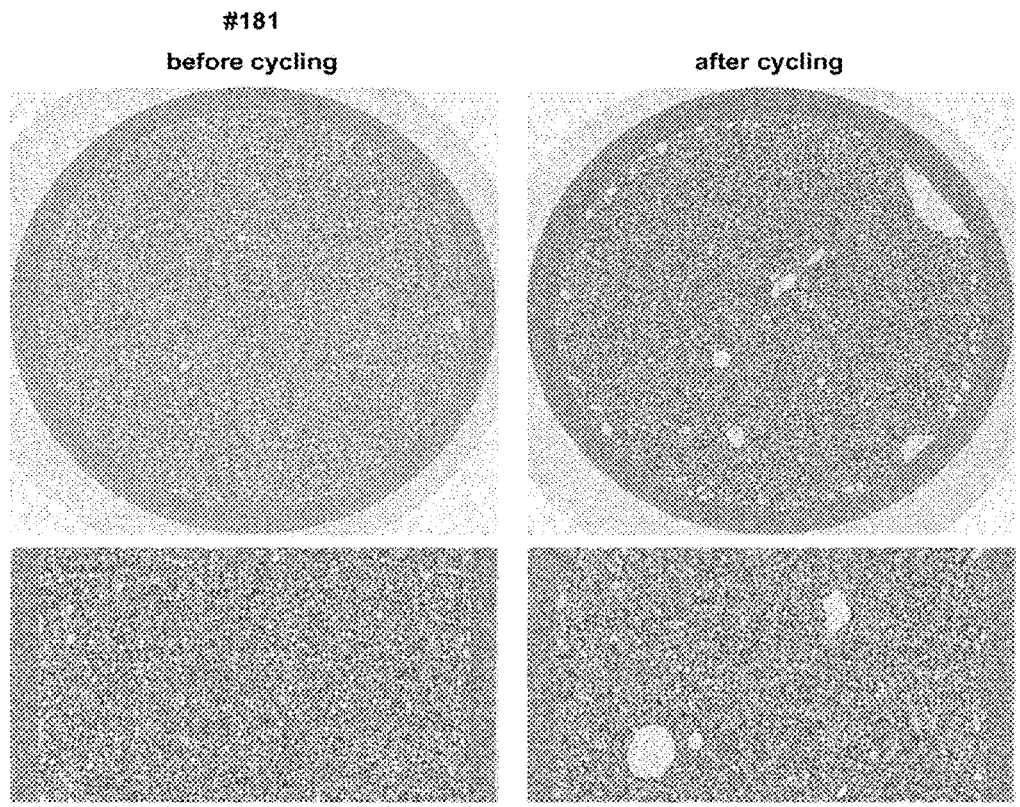
FIG. 10: X-ray tomography images of emulsion #181 (see Table 9);
left fresh after production, right after temperature cycling;
top horizontal slice (tube wall is shown as the outer circle); bottom vertical slice (tube wall is shown left and right of the bottom images); image width 7 millimeter.

The following water-in-oil emulsions were prepared, using a micro-votator (scraped surface heat exchanger) having a throughput of about 10 liter per hour. Emulsions with two different fat levels were produced, 52% fat (Table 6) and 70% fat (Table 9). For each fat level 4 emulsions were produced: with or without sucrose fatty acid ester, and aerated or not aerated. The processes that were used to prepare the emulsions are schematically depicted in FIG. 1 and FIG. 2.

TABLE 6

Compositions of aerated emulsions, with 52% fat.

| | Composition [wt %] | | | |
|---|---|---|---|---|
| Ingredient | #332 −SFAE −gas | #333 −SFAE +gas | #335 +SFAE −gas | #334 +SFAE +gas According to the invention |
| Fat Phase | | | | |
| sunflower oil | 36.08 | 36.08 | 14.29 | 14.29 |
| structuring fat | 17.5 | 17.5 | 10.71 | 10.71 |
| lecithin | 0.10 | 0.10 | 0.10 | 0.10 |
| monoglycerides | 0.20 | 0.20 | 0.20 | 0.20 |
| beta-carotene | 0.20 | 0.20 | 0.20 | 0.20 |
| PGPR | 0.10 | 0.10 | 0.10 | 0.10 |
| Aqueous phase | | | | |
| water | 42.42 | 42.42 | 42.42 | 42.42 |
| starch | 2.50 | 2.50 | 2.50 | 2.50 |
| sorbate | 0.10 | 0.10 | 0.10 | 0.10 |
| salt | 0.30 | 0.30 | 0.30 | 0.30 |
| sweet whey powder | 0.50 | 0.50 | 0.50 | 0.50 |
| Sucrose ester phase | | | | |
| sunflower oil | | | 20.36 | 20.36 |
| structuring fat | | | 6.79 | 6.79 |
| sucrose fatty acid ester S370 | | | 1.43 | 1.43 |

Emulsions #332 and #333 were made according to the process scheme schematically depicted in FIG. 1. This is a prior art process, for example as disclosed in WO2010/112835, wherein an emulsion as a whole is aerated. Emulsions #335 and #334 were made according to the process scheme schematically depicted in FIG. 2, according to the invention. The emulsions were filled into plastic tubs in amounts of about 200 gram in each tub.

Settings of the process according to FIG. 1 for the production of emulsions #332 and #333 are indicated in the following table: The aqueous phase and the oil phase were made separately before being mixed in the premix vessel. The premix was a water-continuous emulsion, which was inverted to a fat-continuous emulsion during the process.

TABLE 7

Process settings for preparation of emulsion #332 and #333 (see Table 6), process as in FIG. 1; and resulting volumetric gas fractions in emulsions.

| Processing unit | volume [mL] | temperature [° C.] | rotation speed impeller [1/min] | description |
|---|---|---|---|---|
| Pre-mix of oil phase and aqueous phase | 10,000 | 60 (55-65) | | mixing the ingredients |
| A-unit 1 | 50 | #332: 20 #333:24 | #332: 1200 #333: 1000 | cooling |
| A-unit 2 | 50 | #332: 8 #333: 10 | #332: 1200 #333: 1000 | cooling |
| C-unit *1 | 150 | cooling to ambient air | 1800 | inversion to fat-continuous emulsion |

TABLE 7-continued

Process settings for preparation of emulsion #332 and #333 (see Table 6), process as in FIG. 1; and resulting volumetric gas fractions in emulsions.

| Processing unit | volume [mL] | temperature [° C.] | rotation speed impeller [1/min] | description |
|---|---|---|---|---|
| C-unit 2 | 75 | cooling to ambient air | #332: 400 #333: 1400 | mixing |

Process settings

| | | | | |
|---|---|---|---|---|
| Flow rate of premix (L/h) | 10 | | | |
| Pressure in the system (bar) | #332: ~7 #333: ~6 | | | |
| Nitrogen gas flow rate (normal L/h*) | #332: 0 #333: 12 | | aeration | |

Resulting gas fractions (in volume %)

| | | | | |
|---|---|---|---|---|
| #332 [vol %] | 0 | | | |
| #333 [vol %] | 24 | | (overrun ~32%) | |

*at atmospheric pressure and room temperature

Settings of the process according to FIG. 2 for the production of emulsions #335 and #334 are indicated in the following table. The sucrose ester phase was filtered after heating of the mixture of oil and Ryoto S370, to remove possible residues.

TABLE 8

Process settings for preparation of emulsion #335 and #334 (see Table 6), process as in FIG. 2; and resulting volumetric gas fractions in emulsions.

| Processing unit | volume [mL] | temperature [° C.] | rotation speed impeller [1/min] | description |
|---|---|---|---|---|
| Emulsion phase | | | | |
| Pre-mix of oil phase and aqueous phase | 10,000 | 60 (55-65) | | mixing the ingredients |
| A-unit 1 | 50 | 22 | 1000 | cooling |
| A-unit 2 | 50 | 9 | 1000 | cooling |
| C-unit *1 | 150 | cooling to ambient air | 2000 | inversion to fat-continuous emulsion |
| C-unit 2 | 75 | cooling to ambient air | #335: 300 #334: 1400 | mixing with sucrose ester phase |
| Sucrose ester phase | | | | |
| C-unit a | 100 | 70 | #335: 1000 #334: 2500 | aeration |
| C-unit *2 | 50 | #335: 12 #334: 30 | <=1000 | cooling after aeration |

Process settings

| | | | | |
|---|---|---|---|---|
| Flow rate premix (L/h) | 10 | | | |
| Flow rate foam mix (L/h) | 4.5 | | | |
| Pressure in the system (bar) | #335: ~4 #334: ~5 | | | |
| Nitrogen gas flow rate (normal L/h) | #335: 0 #334: 6 | | | |

Resulting gas fractions (in volume %)

| | | | | |
|---|---|---|---|---|
| sucrose ester phase[%] | 50 | | (overrun: 100%) | |
| #335 [vol %] | 0 | | | |
| #334 [vol %] | 31 | | (overrun: ~45%) | |

TABLE 9

Compositions of aerated emulsions, with 70% fat.

| | Composition [wt %] | | | |
|---|---|---|---|---|
| Ingredient | #178 −SFAE −gas | #179 −SFAE +gas | #180 +SFAE −gas | #181 +SFAE +gas According to the invention |
| Fat Phase | | | | |
| sunflower oil | 49.43 | 49.43 | 27.64 | 27.64 |
| structuring fat | 22 | 22 | 15.21 | 15.21 |
| lecithin | 0.10 | 0.10 | 0.10 | 0.10 |
| monoglycerides | 0.10 | 0.10 | 0.10 | 0.10 |
| beta-carotene | 0.20 | 0.20 | 0.20 | 0.20 |
| PGPR | 0.10 | 0.10 | 0.10 | 0.10 |
| Aqueous phase | | | | |
| water | 27.27 | 27.27 | 38.18 | 38.18 |
| sorbate | 0.1 | 0.1 | 0.14 | 0.14 |
| salt | 0.3 | 0.3 | 0.42 | 0.42 |
| sweet whey powder | 0.4 | 0.4 | 0.56 | 0.56 |
| Sucrose ester phase | | | | |
| sunflower oil | | | 20.36 | 20.36 |
| structuring fat | | | 6.79 | 6.79 |
| sucrose fatty acid ester S370 | | | 1.43 | 1.43 |

Emulsions #178 and #179 were made according to the process scheme schematically depicted in FIG. 1. This is a prior art process, for example as disclosed in WO2010/112835, wherein an emulsion as a whole is aerated. Emulsions #180 and #181 were made according to the process scheme schematically depicted in FIG. 2, according to the invention. The emulsions were filled into plastic tubs in amounts of about 200 gram in each tub.

Settings of the process according to FIG. 1 for the production of emulsions #178 and #179 are indicated in the following table: The aqueous phase and the oil phase were made separately before being mixed in the premix vessel. In this case the premix emulsion was a fat-continuous emulsion.

TABLE 10

Process settings for preparation of emulsion #178 and #179 (see Table 6), process as in FIG. 1; and resulting volumetric gas fractions in emulsions.

| Processing unit | volume [mL] | temperature [° C.] | rotation speed impeller [1/min] | description |
|---|---|---|---|---|
| Pre-mix of oil phase and aqueous phase | 10,000 | 60 (55-65) | | mixing the ingredients |
| A-unit 1 | 50 | 22 | 1200 | cooling |
| A-unit 2 | 50 | 10 | 1200 | cooling |
| C-unit *1 | 150 | #178: in 10.4 out 14.9 #179: in 10.5 out 14.4 | 300 | mixing |
| C-unit 2 | 75 | #178: in 15.7 out 16.2 #179: in 15.4 out 17.1 | #178: 200 #179: 1400 | mixing |
| Process settings | | | | |
| Flow rate of premix (L/h) | 10 | | | |
| Pressure in the system (bar) | #178: ~7 #179: ~6 | | | |
| Nitrogen gas flow rate (normal L/h) | #178: 0 #179: 9.5 | | | aeration |
| Resulting gas fractions (in volume %) | | | | |
| #178 [vol %] | 0 | | | |
| #179 [vol %] | 28 | | | (overrun: ~38%) |

Settings of the process according to FIG. 2 for the production of emulsions #180 and #181 are indicated in the following table. The sucrose ester phase was filtered after heating of the mixture of oil and Ryoto S370, to remove possible residues.

TABLE 11

Process settings for preparation of emulsion #180 and #181 (see Table 6), process as in FIG. 2; and resulting volumetric gas fractions in emulsions.

| Processing unit | volume [mL] | temperature [° C.] | rotation speed impeller [1/min] | description |
|---|---|---|---|---|
| Emulsion phase | | | | |
| Pre-mix of oil phase and aqueous phase | 10,000 | 60 (55-65) | | mixing the ingredients |
| A-unit 1 | 50 | 22 | 1200 | cooling |
| A-unit 2 | 50 | 8 | 1200 | cooling |
| C-unit *1 | 150 | #180: in 8 out 13 #181: in 14 out 17 | 300 | inversion |
| C-unit 2 | 75 | #180: in 8 out 13 #181: in 14 out 18 | 1400 | mixing with sucrose ester phase |

TABLE 11-continued

Process settings for preparation of emulsion #180 and #181 (see Table 6), process as in FIG. 2; and resulting volumetric gas fractions in emulsions.

| Processing unit | volume [mL] | temperature [° C.] | rotation speed impeller [1/min] | description |
|---|---|---|---|---|
| Sucrose ester phase | | | | |
| C-unit a | 100 | 70 | 2500 | aeration |
| C-unit *2 | 50 | 10 | <=1000 | cooling after aeration |
| Process settings | | | | |
| Flow rate premix (L/h) | 10 | | | |
| Flow rate foam mix (L/h) | 4.4 | | | |
| Pressure in the system (bar) | #180: ~6 #181: ~7 | | | |
| Nitrogen gas flow rate (normal L/h) | #180: 0 #181: 6 | | | |
| Resulting gas fractions (in volume %) | | | | |
| sucrose ester phase [vol %] | 50 | | | (overrun: 100%) |
| #180 [vol %] | 0 | | | |
| #181 [vol %] | 30 | | | (overrun: ~43%) |

Analysis of Bubble Size

The emulsions that were produced were subjected to a temperature cycling regime. The emulsions were stored in a temperature controlled cabinet during a period of 74 hours. The temperature regime in the cabinet was the following:

24 hours at 5° C.
24 hours at 25° C.
24 hours at 5° C.
2 hours at 10° C.

After temperature cycling, the samples were stored at 5° C. for 19 hours for x-ray tomography analysis.

The temperature cycling regime is done in order to mimic normal household usage of an emulsion and challenge the structure of the emulsions. Depending on the amount used each day, the consumer takes a container with a spread inside and outside a fridge, for use and storage. Such a spread can be stored in the fridge up to several months. Hence an emulsion undergoes various temperature changes during its life time. The better an emulsion retains its structure during such temperature cycling, the better it is. This extreme temperature cycling is a good test to investigate whether the emulsion is stable against varying storage and use temperatures.

X-Ray Imaging of the Emulsions

The bubble size of the emulsions was determined, both before and after temperature cycling, using x-ray tomography, as described herein before. FIG. 3 to FIG. 10 show images made using x-ray tomography to determine the influence of the cycling on the structure. The images on the left hand side and the right hand side of the figures are not the same samples. On the left hand side of each figure, samples are shown taken from filled tubs taken shortly after preparation. The two images on the left in each figure are taken from the same sample. On the right hand side of each figure, samples are shown taken from other filled tubs that have undergone temperature cycling. These samples are filled in the tubes for analysis using X-ray tomography. The two images on the right in each figure are taken from the same sample. The images Low-fat emulsions (52%): comparing samples #333 and #334 (FIG. 4, FIG. 6) shows that the emulsion #334 (prepared according to the method of the invention) has a finer bubble structure than #333 (according to the prior art), before cycling. The gas volumetric fraction of #334 that was obtained is higher than that of #333, 31% and 24%, respectively.

Emulsion #333 (FIG. 4) shows that a wide range of gas bubble sizes is present in the sample prior to cycling. The emulsion does not have a finely distributed homogeneous bubble population. After cycling, a large number of large gas bubbles have formed, apparently due to coalescence and proportioning of finer bubbles during the temperature cycling. Hence this emulsion is not suitable for household use, as the structure changes too much during the storage.

Emulsion #334 (FIG. 6, according to the invention) shows a finer structure and more homogeneously divided gas bubbles than emulsion #333. Near the inner wall of the plastic tube though, some larger bubbles can be observed. These are artefacts, large bubbles generated during the filling of the tube with the emulsion. The centre of the tube shows homogeneously distributed gas bubbles. Also after cycling, close to the inner wall of the tube, some large bubbles can be observed. Not in the centre though, which means that this emulsion, prepared according to the method of the invention, retains its structure during the cycling regime.

Comparing the structure of emulsions #332 and #335, which are not aerated, before and after temperature cycling (FIG. 3, FIG. 5), shows that the structure of these emulsions does not change as observed using this technique. This is not only true for the emulsion #332, that is prepared using a conventional process. This is also true for emulsion #335, that is prepared using the process according to FIG. 2, without introduction of gas though. This shows that the temperature cycling is a good method to determine the influence on the gas bubbles and on the stability of the structure of the emulsions. Because the structure of the fat and aqueous phases apparently does not influence the emulsion structure, the influence of the temperature on the gas bubbles can be investigated in isolation.

High-fat emulsions (70%): observation of the aerated emulsions #179 and #181 (FIG. 8, FIG. 10) shows the same trends as observed for the 52% fat emulsions. The emulsion #179 (according to the prior art) has a wide range of bubble sizes, and does not have a homogeneous fine bubble structure. After cycling the bubbles have become larger, and a coarse structure is observed. Emulsion #181 (prepared according to the invention) has a finer bubble structure. After cycling a few bigger gas bubbles are observed. Especially along the tube wall, coarser bubbles are observed. These may be artefacts, caused by the filling of the tube. Also some bigger bubbles are observed in the centre of the image. The distribution of bubble sizes still is much more homogeneous than in emulsion #179 after cycling.

These results shows that the emulsions #334 and #181 that are prepared according to the method of the invention, have a finer and more homogeneous bubble structure, and are more stable after temperature cycling, compared to the aerated emulsions #333 and #179, that are according to the prior art.

Determination of Gas Bubble Sizes Using X-Ray Tomography

The aerated emulsions #333, #334, #179, and #181 were analysed to determine the average gas bubble sizes before and after cycling. The image analysis software of the x-ray tomography device, as described above, was used for this analysis.

The following table summarises the results. This table shows:

- The volume fraction of gas that was determined fresh after production.
- The volume fraction of gas that was calculated from the x-ray images, both fresh after production as well as after cycling; these data also contain the minimum and maximum values as well as the standard deviation as calculated. The threshold value for the image analysis for adjusted in order to obtain similar gas volume fractions.
- The number average diameter d1,0 of the gas bubbles, containing also the maximum, and minimum values as measured, the standard deviation, and the number of counts on which the d1,0 is based.
- The volume based average diameter d4,3.

Additionally FIG. 11, FIG. 12, FIG. 13, and FIG. 14 show the volume of gas as function of the volume based equivalent diameter.

TABLE 12

Average gas bubble size in aerated emulsions as determined from x-ray tomography images.

| | #333 −SFAE, +gas, 52% fat | | #334 +SFAE, +gas, 52% fat | | #179 −SFAE, +gas, 70% fat | | #181 +SFAE, +gas, 70% fat | |
|---|---|---|---|---|---|---|---|---|
| | Fresh | Cycled | Fresh | Cycled | Fresh | Cycled | Fresh | Cycled |
| Volume fraction gas measured* [%] | 24 | | 31 | | 28 | | 30 | |
| Volume fraction gas calculated [%] | 23.0 | 18.6 | 32.5 | 27.1 | 28.4 | 22.2 | 31.6 | 25.1 |
| min | 20.7 | 14.4 | 31.8 | 26.2 | 27.3 | 20.2 | 30.6 | 23.7 |
| max | 28.1 | 22.5 | 33.7 | 28.6 | 29.3 | 25.1 | 32.6 | 27.0 |
| st. dev. | 1.4 | 2.2 | 0.3 | 0.5 | 0.5 | 1.2 | 0.4 | 0.8 |
| equivalent diameter values | | | | | | | | |
| d1, 0 | 24.7 | 26.5 | 31.6 | 29.5 | 26.8 | 25.0 | 30.8 | 27.8 |
| st. dev. | 12.1 | 17.6 | 12.3 | 12.5 | 13.4 | 14.8 | 12.6 | 11.8 |
| max | 809.2 | 983.6 | 143.2 | 684.2 | 471.9 | 955.3 | 482.3 | 832.1 |

TABLE 12-continued

Average gas bubble size in aerated emulsions as determined from x-ray tomography images.

|  | #333 −SFAE, +gas, 52% fat | | #334 +SFAE, +gas, 52% fat | | #179 −SFAE, +gas, 70% fat | | #181 +SFAE, +gas, 70% fat | |
| --- | --- | --- | --- | --- | --- | --- | --- | --- |
|  | Fresh | Cycled | Fresh | Cycled | Fresh | Cycled | Fresh | Cycled |
| min | 7.2 | 7.2 | 7.2 | 7.2 | 7.2 | 7.2 | 7.2 | 7.2 |
| # of counts | 900680 | 282700 | 823390 | 858270 | 920410 | 544140 | 909720 | 905940 |
| d4, 3 | 80.2 | 261.0 | 45.2 | 56.8 | 73.0 | 219.1 | 47.7 | 73.0 |

*see Table 7, Table 8, Table 10, Table 11

The following conclusions can be drawn from this table.

The volume fraction of gas that is determined in the fresh samples comes close to the measured volume fraction of gas; this shows that the image analysis software used to analyse the x-ray images is a useful tool to determine the gas volume. When scanning various stacked images of the samples (across the vertical direction of the tubes in the x-ray tomography apparatus), it was shown that the variation of the gas volume in the samples varies was larger in the samples without sucrose fatty acid ester (#333, #179) than in the samples with sucrose fatty acid ester (#334, #181). This can also be seen from the minimum, maximum, and standard deviation in the table, as well as from FIG. 4, FIG. 6, FIG. 8, and FIG. 10.

The d1,0 value of the gas bubbles is based on a large number of counts. The maximum values show that after cycling the samples without sucrose fatty acid ester have a larger maximum bubble size than the corresponding sample with sucrose fatty acid ester. The number average diameter d1,0 does not show a clear trend before and after cycling, and when counting a large number of bubbles, a few large bubbles do not influence the number average a lot.

The d4,3 does show a trend before and after cycling, as big bubbles that are formed during the cycling do have a big influence on the volume average equivalent diameter. In all samples the d4,3 value increases after cycling. However, it can clearly be seen from the data the samples with sucrose fatty acid ester (#334, #181) have a much smaller increase of d4,3 than the samples without sucrose fatty acid ester (#333, #179). These quantitative data confirm the images as shown in FIG. 4, FIG. 6, FIG. 8, and FIG. 10. The images show that the samples #333 and #179 have more large bubbles after cycling than the samples #334 and #181. This is reflected in the d4,3 values.

The following can be concluded from FIG. 11 to FIG. 14.

Figure 11:
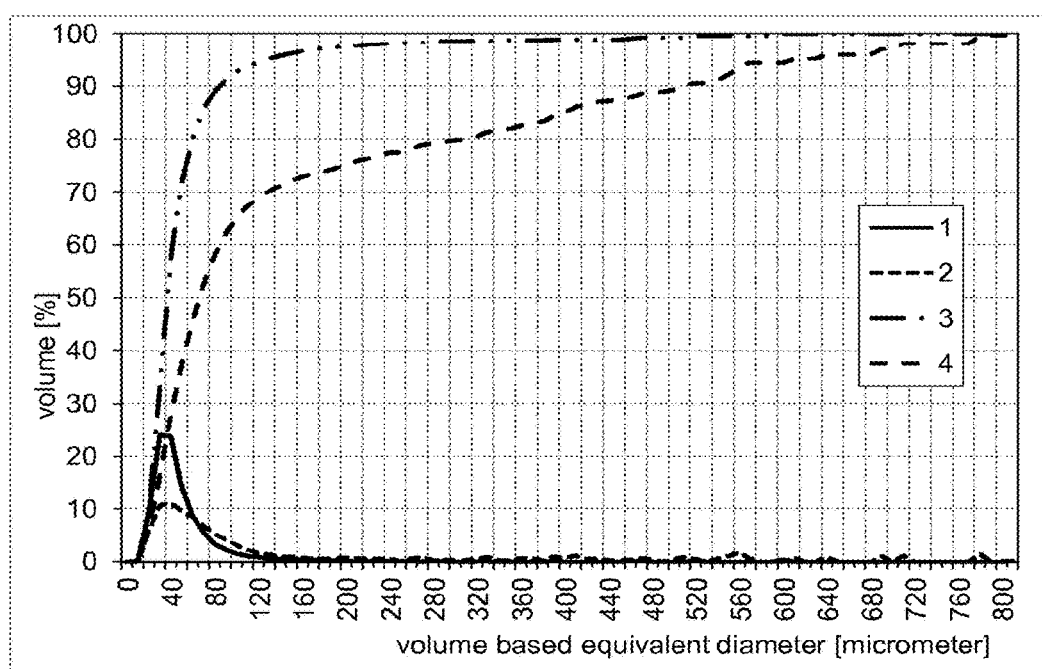
FIG. 11: Bubble volume as function of volume equivalent bubble diameter, emulsion #333 (see Table 6); legend:
1: bubble volume fresh after production
2: bubble volume after cycling regime
3: cumulative bubble volume fresh after production
4: cumulative bubble volume after cycling regime

FIG. 11, emulsion #333 (52% fat, no sucrose fatty acid ester): this shows the volume percentage of the gas as function of the volume based equivalent diameter of the bubbles. The curves 1 and 2 should be read and interpreted in the following way.

Curve 1 (fresh sample) shows that about 25% of the total volume of the gas bubbles in the sample is obtained from bubbles having a volume based equivalent diameter with a size of about 40 micrometer.

Curve 2 (cycled sample) shows that about 11% of the total volume of the gas bubbles in the sample is obtained from bubbles having a volume based equivalent diameter with a size of about 40 micrometer. This curve also shows some little peaks at values in the hundreds of micrometers, showing that large bubbles have been formed during the cycling.

The corresponding cumulative curves 3 and 4 show the following.

Curve 3 (fresh sample) indicates the cumulative volume percentage as function of the volume based equivalent diameter of the gas bubbles. About 50% of the volume of the gas bubbles is made up of bubbles having a volume based equivalent diameter of about 45 micrometer, and about 80% of the gas volume is made up of bubbles having a volume based equivalent diameter of smaller than about 65 micrometer.

Curve 4 (cycled sample) clearly shows the influence of the cycling: the cumulative volume curve has a much smaller slope than curve 3. This is caused as much more larger bubbles are present, the d4,3 has increased and this is reflected in the cumulative volume percentage. About 50% of the volume of the gas bubbles is made up of bubbles having a volume based equivalent diameter of about 75 micrometer, and about 80% of the gas volume is made up of bubbles having a volume based equivalent diameter of smaller than about 315 micrometer.

Figure 12:
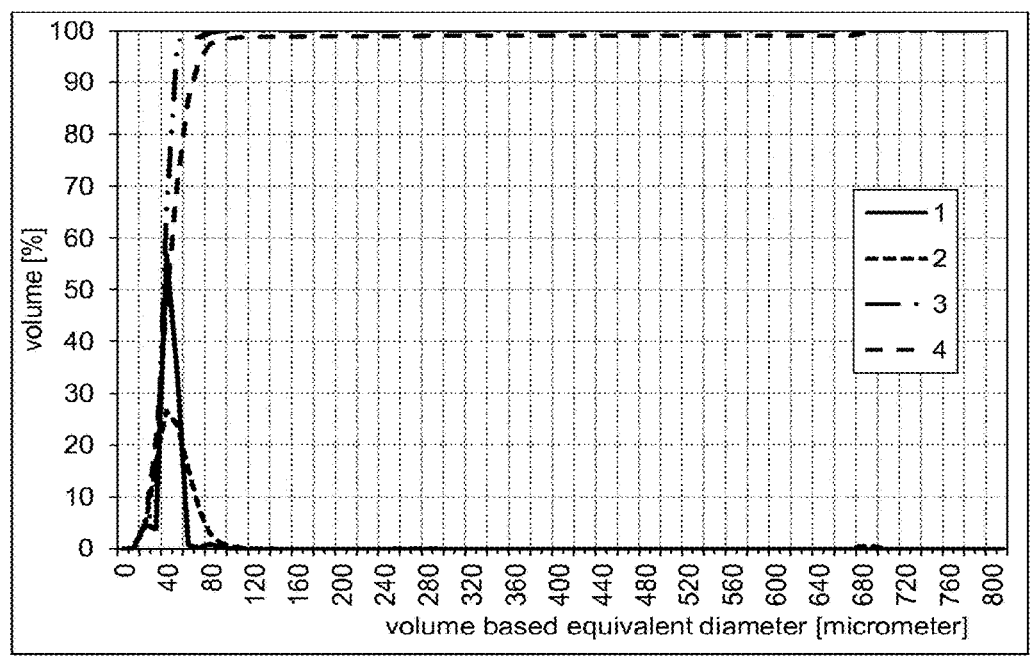
FIG. 12: Bubble volume as function of volume equivalent bubble diameter, emulsion #334 (see Table 6); legend:
1: bubble volume fresh after production
2: bubble volume after cycling regime
3: cumulative bubble volume fresh after production
4: cumulative bubble volume after cycling regime

FIG. 12, emulsion #334 (52% fat, with sucrose fatty acid ester): this shows the volume percentage of the gas as function of the volume based equivalent diameter of the bubbles.

Curve 1 (fresh sample) shows that about 57% of the total volume of the gas bubbles in the sample is obtained from bubbles having a volume based equivalent diameter with a size of about 45 micrometer. Moreover the peak is much narrower than in the corresponding sample #333, showing that the size distribution is more narrow.

Curve 2 (cycled sample) shows that about 27% of the total volume of the gas bubbles in the sample is obtained from bubbles having a volume based equivalent diameter with a size of about 50 micrometer. This curve is also more narrow than of the corresponding sample #333.

The corresponding cumulative curves 3 and 4 show the following.

Curve 3 (fresh sample) shows the cumulative volume percentage as function of the volume based equivalent diameter of the gas bubbles. This has a steep rise to nearly 100% of the volume, as compared to the corresponding sample #333. This shows that the bubble size distribution of this sample #334 containing sucrose fatty acid ester is more homogeneous than the sample #333 without sucrose fatty acid ester. About 50% of the volume of the gas bubbles is made up of bubbles having a volume based equivalent diameter of smaller than about 45 micrometer, and about 80% of the gas volume is made up of bubbles having a volume based equivalent diameter of smaller than about 50 micrometer.

Curve 4 (cycled sample) also shows a steep rise to nearly 100% of the gas volume. The cycling apparently does not have much effect, as the curves 3 and 4 are very close. That means that the bubble size distribution is still rather narrow and homogeneous. This is also reflected in the d4,3 values before and after cycling, which does not rise dramatically (Table 12). About 50% of the volume of the gas bubbles is made up of bubbles having a volume based equivalent diameter of about 50 micrometer, and about 80% of the gas volume is made up of bubbles having a volume based equivalent diameter of smaller than about 60 micrometer.

Figure 13:
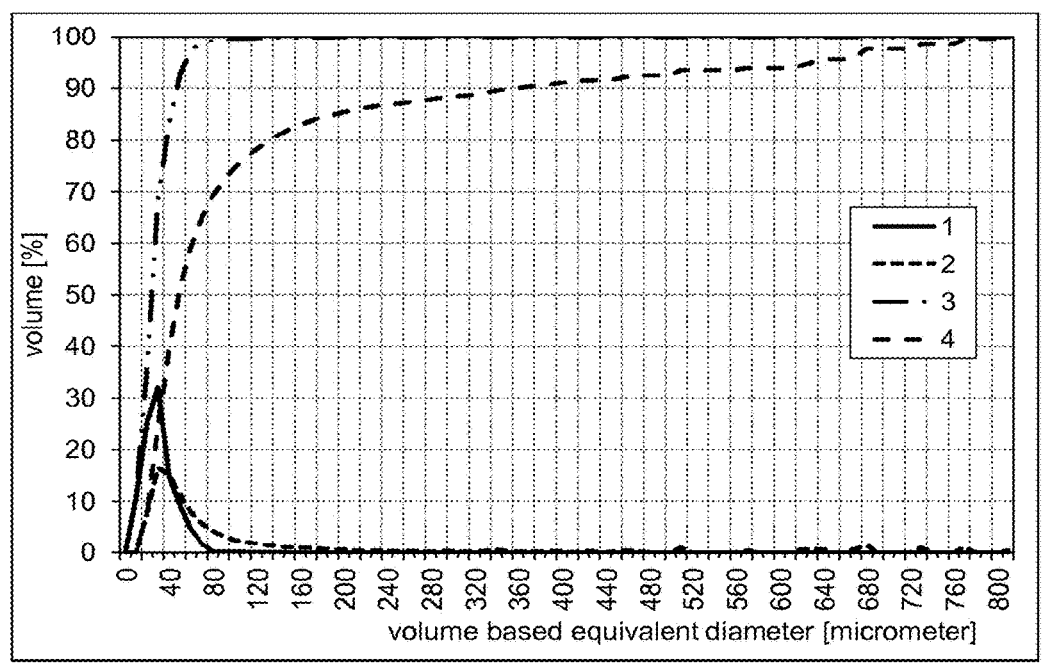
FIG. 13: Bubble volume as function of volume equivalent bubble diameter, emulsion #179 (see Table 9); legend:
1: bubble volume fresh after production
2: bubble volume after cycling regime
3: cumulative bubble volume fresh after production
4: cumulative bubble volume after cycling regime

FIG. 13, emulsion #179 (70% fat, without sucrose fatty acid ester): this shows the volume percentage of the gas as function of the volume based equivalent diameter of the bubbles. The trends in this figure are similar as in FIG. 11 (emulsion #333, 52% fat, no sucrose fatty acid ester).

Curve 1 (fresh sample) shows that about 32% of the total volume of the gas bubbles in the sample is obtained from bubbles having a volume based equivalent diameter with a size of about 35 micrometer.

Curve 2 (cycled sample) shows that about 16% of the total volume of the gas bubbles in the sample is obtained from bubbles having a volume based equivalent diameter with a size of about 35 micrometer. This curve also shows some little peaks at values in the hundreds of micrometers, showing that large bubbles have been formed during the cycling.

The corresponding cumulative curves 3 and 4 show the following.

Curve 3 (fresh sample) indicates the cumulative volume percentage as function of the volume based equivalent diameter of the gas bubbles. About 50% of the volume of the gas bubbles is made up of bubbles having a volume based equivalent diameter of about 30 micrometer, and about 80% of the gas volume is made up of bubbles having a volume based equivalent diameter of smaller than about 45 micrometer.

Curve 4 (cycled sample) clearly shows the influence of the cycling: the cumulative volume curve has a much smaller slope than curve 3. This is caused as much more larger bubbles are present, the d4,3 has increased and this is reflected in the cumulative volume percentage. About 50% of the volume of the gas bubbles is made up of bubbles having a volume based equivalent diameter of about 55 micrometer, and about 80% of the gas volume is made up of bubbles having a volume based equivalent diameter of smaller than about 140 micrometer.

Figure 14:
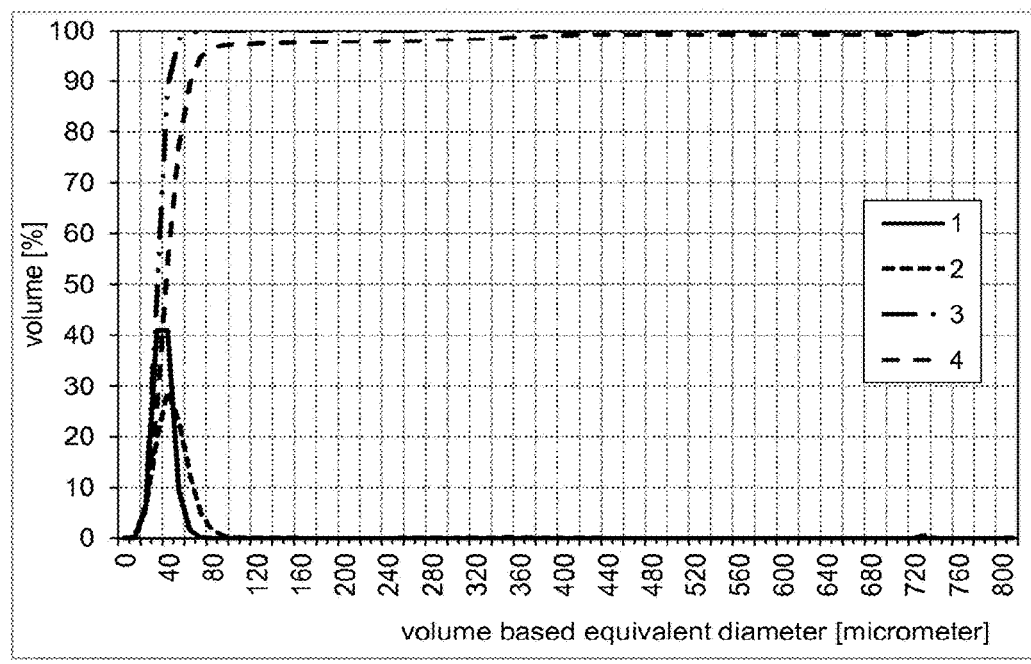
FIG. 14: Bubble volume as function of volume equivalent bubble diameter, emulsion #181 (see Table 9); legend:
1: bubble volume fresh after production
2: bubble volume after cycling regime
3: cumulative bubble volume fresh after production
4: cumulative bubble volume after cycling regime

FIG. 14, emulsion #181 (70% fat, with sucrose fatty acid ester): this shows the volume percentage of the gas as function of the volume based equivalent diameter of the bubbles. The trends in this figure are similar as in FIG. 12 (emulsion #334, 52% fat, with sucrose fatty acid ester).

Curve 1 (fresh sample) shows that about 42% of the total volume of the gas bubbles in the sample is obtained from bubbles having a volume based equivalent diameter with a size of about 40 micrometer. Moreover the peak is much narrower than in the corresponding sample #179, showing that the size distribution is more narrow.

Curve 2 (cycled sample) shows that about 29% of the total volume of the gas bubbles in the sample is obtained from bubbles having a volume based equivalent diameter with a size of about 55 micrometer. This curve is also more narrow than of the corresponding sample #179.

The corresponding cumulative curves 3 and 4 show the following.

Curve 3 (fresh sample) shows the cumulative volume percentage as function of the volume based equivalent diameter of the gas bubbles. This has a steep rise to nearly 100% of the volume, as compared to the corresponding sample #179. This shows that the bubble size distribution of this sample #181 containing sucrose fatty acid ester is narrower than the sample #179 without sucrose fatty acid ester. About 50% of the volume of the gas bubbles is made up of bubbles having a volume based equivalent diameter of smaller than about 35 micrometer, and about 80% of the gas volume is made up of bubbles having a volume based equivalent diameter of smaller than about 45 micrometer.

Curve 4 (cycled sample) also shows a steep rise to nearly 100% of the gas volume. The cycling apparently does not have much effect, as the curves 3 and 4 are very close. That means that the bubble size distribution is still rather narrow and homogeneous. This is also reflected in the d4,3 values before and after cycling, which does not rise dramatically (Table 12). About 50% of the volume of the gas bubbles is made up of bubbles having a volume based equivalent diameter of about 45 micrometer, and about 80% of the gas volume is made up of bubbles having a volume based equivalent diameter of smaller than about 60 micrometer.

Concluding the images and data show that the emulsions prepared according to the method of the invention are more stable than the emulsions not according to the invention.

Water Droplet Size, Hardness, and Spattering Values of Emulsions

Water droplet sizes and hardness of the emulsions were determined according to the procedure described above. Results are indicated in the following table.

TABLE 13

Average water droplet size and Stevens hardness of emulsions.

| Sample# | d3,3 [micrometer] | exp(sigma) [—] | Stevens hardness [g] |
|---|---|---|---|
| 52% fat emulsions | | | |
| #332 | 4.5 | 1.5 | 153 |
| #333 | 5 | 2.0 | 126 |
| #335 | 6.3 | 1.9 | 290 |
| #334 | 6.1 | 1.8 | 179 |
| 70% fat emulsions | | | |
| #178 | 4.2 | 1.9 | 156 |
| #179 | 3.6 | 1.4 | 113 |
| #180 | 3.5 | 1.4 | 110 |
| #181 | 4 | 1.6 | 96 |

In all cases the average water droplet size d3,3 is less than 10 micrometer. That means that the water droplets are finely divided in the continuous fat phase. The presence or absence of gas bubble does not have a clear effect on the water droplet size on the corresponding sample without air (332 vs. 333, 335 vs. 334, 178 vs. 179, 180 vs. 181). Also the distribution of bubble size is narrow, as the exp(sigma) for all samples is maximally 2.0.

The hardness of the samples shows that the presence of the gas bubbles does not decrease the hardness a lot. The Stevens value of the aerated emulsions is still above the desired value of 80 gram.

The spattering tests of the emulsions yield the following results:

TABLE 14

Measured primary and secondary spattering values (SV1, SV2) of emulsions.

| Sample # | SV1 | SV2 |
|---|---|---|
| Reference* | 8.5 | 5.5 |
| 52% fat emulsions | | |
| 332 | 6 | 4 |
| 333 | 7 | 4.5 |
| 335 | 8.5 | 7 |
| 334 | 10 | 8.5 |
| 70% fat emulsions | | |
| 178 | 3 | 4.5 |
| 179 | 5 | 3.5 |
| 180 | 6.5 | 5 |
| 181 | 8 | 5.5 |

*Reference is commercially available Blue Band wrapper margarine with about 79% fat, contains lecithin as anti-spattering agent (ex Unilever, Rotterdam, Netherlands).

The spattering values show that the presence of gas bubbles especially has a positive effect on the SV1 value, meaning on the spattering of water bubbles when the emulsion is heated in a pan, and the water evaporates and the gas bubbles escape from the emulsion. This can be seen especially when comparing the SV1 values of the corresponding samples (332 vs. 333, 335 vs. 334, 178 vs. 179, 180 vs. 181). Also the aerated emulsions produced according to the method of the invention (#334, #181) have a higher SV1 value than the aerated emulsions prepared according to a conventional process (#333, #179). This shows that emulsions prepared according to the method of the invention have an improved spattering behaviour when heated to be used for shallow frying of food products. Please note that these emulsions are not yet optimised to reduce the spattering as much as possible.

All emulsions that were produced were tested on spreadability, following the procedure described herein before. All emulsions had a good spreadability value: for all emulsions the obtained value was 1.

Example 5: Use of Emulsions in Baking of Cake

The emulsions that were produced were used in baking of 8 cakes, in order to investigate the influence of the sucrose fatty acid ester and the air in the emulsions on the cake that was obtained. The recipe of the cakes was the following:
baking powder 4 gram
sugar 100 gram
emulsions (as made herein, Table 6 and Table 9) 100 gram
eggs 100 gram
wheat flour 100 gram
Procedure:
1. Mix emulsions and sugar together for 3 minutes by household mixer (Bosch clever mixx 300 W mixer), in total 8 batches.
2. Add eggs and mix together at the same speed for 2 minutes.
3. Add flour and baking powder together and mix homogeneously with the mixture.
4. Put mixtures into cake mould.
5. Preheat oven at 150° C., and bake the cakes for 70 minutes.

After baking the texture was analysed, by determining the Stevens hardness of the obtained cake, using a texture analyzer as described above, with a round profile 2.5 centimeter probe, and sample thickness 3 centimeter. The firmness of the cakes is indicated in the following table.

TABLE 15

The hardness of cakes prepared with the emulsions from Table 6 and Table 9.

| cake with emulsion# | hardness [g] |
|---|---|
| cake with #332 | 473 |
| cake with #333 | 402 |
| cake with #335 | 692 |
| cake with #334 | 690 |
| cake with #179 | 283 |
| cake with #180 | 302 |
| cake with #181 | 501 |
| cake with #182 | 552 |

This shows that the cakes made with emulsions with sucrose fatty acid ester (#335, #334, #181, #182) are firmer than the corresponding cakes made without emulsions with sucrose fatty acid ester (#332, #333, #179, #180). These cakes with sucrose fatty acid ester were much easier to cut with a knife than the cakes without sucrose fatty acid ester, as they were less crumbling upon cutting.

The invention claimed is:

1. A method for preparation of a composition in the form of an aerated water-in-oil emulsion, having an overrun ranging from 1% to 200%, comprising the steps:
   a) preparing a water-in-oil emulsion;
   b) providing a liquid mixture of a sucrose fatty acid ester having a HLB value ranging from 1 to 7 and an oil and aerating this mixture; and
   c) mixing the aerated mixture from step b) with the emulsion from step a) to provide the composition;
wherein the composition comprises a volume of gas made up by gas bubbles.

2. The method according to claim 1, wherein in step a) the emulsion is in the form of a spread.

3. The method according to claim 1, wherein in step b) the sucrose fatty acid ester has a HLB value ranging from 1 to 6.

4. The method according to claim 1, wherein in step b) the concentration of sucrose fatty acid ester ranges from 1% to 25% by weight of the mixture of step b).

5. The method according to claim 1, wherein the sucrose fatty acid ester comprises one or more compounds chosen from the group consisting of sucrose tristearate, sucrose tetrastearate, sucrose pentastearate, sucrose tripalmitate, sucrose tetrapalmitate, and sucrose pentapalmitate.

6. The method according to claim 1, wherein the sucrose fatty acid ester has an ester composition wherein the amount of mono-ester is maximally 40% of the total amount of ester.

7. The method according to claim 1, wherein the overrun of the aerated mixture in step b) ranges from 10% to 500%.

8. The method according to claim 1, wherein the composition comprises oil at a concentration ranging from 30% to 90% by weight of the composition.

9. The method according to claim 1, wherein the weight ratio between the mixture from step a) and step b) ranges from 10:1 to 1:3.

10. The method according to claim 1, wherein the overrun of the composition ranges from 10% to 100%.

11. The method according to claim 1, wherein at least 50% of the volume of the gas in the composition is made up by gas bubbles having a volume based equivalent diameter of maximally 60 micrometer.

12. The method according to claim 1, wherein the gas bubbles have a volume average mean bubble size diameter of maximally 70 micrometer.

\* \* \* \* \*